United States Patent
Clough et al.

(10) Patent No.: US 10,513,583 B2
(45) Date of Patent: Dec. 24, 2019

(54) ORGANOBORANE-CONTAINING COMPOSITIONS, AND METHODS OF USING SAME

(71) Applicant: 3M INNOVATIVE PROPERTIES COMPANY, St. Paul, MN (US)

(72) Inventors: Robert S. Clough, St. Paul, MN (US); Gregory P. Karp, Mahtomedi, MN (US); Zachary J. Thompson, Woodbury, MN (US); Guy D. Joly, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 17 days.

(21) Appl. No.: 15/129,331

(22) PCT Filed: Mar. 20, 2015

(86) PCT No.: PCT/US2015/021838
§ 371 (c)(1),
(2) Date: Sep. 26, 2016

(87) PCT Pub. No.: WO2015/148319
PCT Pub. Date: Oct. 1, 2015

(65) Prior Publication Data
US 2017/0174839 A1    Jun. 22, 2017

Related U.S. Application Data
(60) Provisional application No. 61/971,352, filed on Mar. 27, 2014.

(51) Int. Cl.
| | | |
|---|---|---|
| C08G 75/045 | (2016.01) | |
| C08G 75/12 | (2016.01) | |
| C08G 77/28 | (2006.01) | |
| C08F 4/54 | (2006.01) | |
| C09D 183/08 | (2006.01) | |
| C08L 83/08 | (2006.01) | |
| C09J 183/08 | (2006.01) | |
| C08G 77/08 | (2006.01) | |
| C08F 236/20 | (2006.01) | |
| C08F 222/10 | (2006.01) | |

(52) U.S. Cl.
CPC .............. *C08G 75/045* (2013.01); *C08F 4/54* (2013.01); *C08G 75/12* (2013.01); *C08G 77/08* (2013.01); *C08G 77/28* (2013.01); *C08L 83/08* (2013.01); *C09D 183/08* (2013.01); *C09J 183/08* (2013.01); *C08F 236/20* (2013.01); *C08F 2222/1026* (2013.01)

(58) Field of Classification Search
CPC .................................................. C08G 75/045
See application file for complete search history.

(56) References Cited

U.S. PATENT DOCUMENTS

| | | | |
|---|---|---|---|
| 3,275,611 A | | 9/1966 | Mottus |
| 3,661,744 A | | 5/1972 | Kehr |
| 3,898,349 A | * | 8/1975 | Kehr ................... C08G 75/045 |
| | | | 427/136 |
| 4,008,341 A | * | 2/1977 | Kehr ........................ C08F 2/38 |
| | | | 427/516 |
| 4,538,920 A | | 9/1985 | Drake |
| 5,082,147 A | | 1/1992 | Jacobs |
| 5,100,929 A | | 3/1992 | Jochum |
| 5,106,928 A | | 4/1992 | Skoultchi |
| 5,616,796 A | | 4/1997 | Pocius |
| 5,621,143 A | | 4/1997 | Pocius |
| 5,872,197 A | * | 2/1999 | Deviny .................... C08F 4/52 |
| | | | 156/332 |
| 6,252,023 B1 | | 6/2001 | Moren |
| 6,410,667 B1 | | 6/2002 | Moren |
| 6,486,090 B1 | | 11/2002 | Moren |
| 6,605,687 B1 | | 8/2003 | Gross |

(Continued)

FOREIGN PATENT DOCUMENTS

| | | |
|---|---|---|
| CN | 102458691 A | 5/2012 |
| JP | S55-152737 | 11/1980 |

(Continued)

OTHER PUBLICATIONS

Bruno Bock Thiochemicals. Mercaptofunction Binders, Additives and Crosslinkers for Coatings, Adhesives & Sealants, Brochure, Mar. 2013, 5 pages.

Ichinose, "Et3B Induced Radical Addition of Thiols to Acetylenes", 1987, Chemistry Letters (The Chemical Society of Japan), pp. 1647-1650.

(Continued)

*Primary Examiner* — Margaret G Moore
(74) *Attorney, Agent, or Firm* — Bradford B. Wright

(57) ABSTRACT

A polymerizable composition that includes: an organoborane-base complex, wherein the base is a complexing agent selected from a compound having one or more amine groups, amidine groups, hydroxide groups, alkoxide groups, or combinations thereof; a decomplexing agent that liberates the organoborane from the organoborane-base complex; a polymerizable thiol-containing component that includes at least one polymerizable thiol-containing compound having a plurality of thiol groups in which the sulfur atom of the thiol group is covalently bonded to carbon; and a polymerizable ethylenically unsaturated component that includes at least one polymerizable ethylenically unsaturated compound having a plurality of ethylenically unsaturated groups; wherein the total amount of the thiol-containing and ethylenically unsaturated compounds total at least 50% by weight of all polymerizable material in the composition.

18 Claims, No Drawings

(56) References Cited

U.S. PATENT DOCUMENTS

| | | | |
|---|---|---|---|
| 6,652,281 | B1 | 11/2003 | Eckhardt |
| 6,740,716 | B2 | 5/2004 | Webb |
| 6,777,512 | B1 | 8/2004 | Sonnenschein |
| 6,844,080 | B2 | 1/2005 | Keeafsey |
| 6,849,569 | B2 | 2/2005 | Moren |
| 6,939,932 | B2* | 9/2005 | Kneafsey .................. C08F 4/52 106/18.13 |
| 7,105,584 | B2 | 9/2006 | Chambers et al. |
| 7,189,463 | B2 | 3/2007 | Kneafsey |
| 7,267,886 | B2 | 9/2007 | Kneafsey |
| 7,371,466 | B2 | 5/2008 | Kneafsey |
| 7,732,543 | B2 | 6/2010 | Loch |
| 9,080,000 | B2* | 7/2015 | Ahn ...................... C08F 293/00 |
| 2003/0120005 | A1* | 6/2003 | Webb ................. C08G 18/3268 526/134 |
| 2004/0097673 | A1* | 5/2004 | Kneafsey .................. C08F 4/52 526/196 |
| 2005/0032994 | A1 | 2/2005 | Deviny |
| 2008/0085983 | A1 | 4/2008 | Ahn |
| 2009/0247720 | A1* | 10/2009 | Wang ..................... C08G 18/10 528/7 |
| 2011/0294958 | A1* | 12/2011 | Ahn ...................... C08F 293/00 525/267 |

FOREIGN PATENT DOCUMENTS

| | | |
|---|---|---|
| JP | H10-0306509 | 2/1998 |
| WO | WO 2010-149746 | 12/2010 |
| WO | WO 2012-071243 | 5/2012 |
| WO | WO 2012-082224 | 6/2012 |

OTHER PUBLICATIONS

Masuda, "A Remarkably Efficient Initiation by 9-BBN in the Radical Addition Reactions of Alkanethiols to Alk;-1-enes", 1991, J. Chem. Soc. Chem. Commun, pp. 1444-1445.

Muller, "Photocrosslinking of Silicones. Part 13. Photoinduced Thiol-ene crosslinking of modified silicones", 1996, Pure App Chem, vol. A33, No. 4, pp. 439-457.

Siggia, "Quantitative Organic Analysis via Functional Groups", Wiley & Sons, 1963, pp. 582-586.

Snell, Commercial Methods of Analysis—Saponifiable Fats and Oils, McGraw Hill. 1944, Chapter 17, pp. 337-366.

Thiokol® LP (Liquid Polysulfide Polymer), Brochure, Jun. 2004. 12 pages.

International Search report on PCT International Application No. PCT/US2015/021838 dated May 29, 2015, 3 pages.

* cited by examiner

ORGANOBORANE-CONTAINING COMPOSITIONS, AND METHODS OF USING SAME

BACKGROUND

There is a need for materials and chemistries that can form polymers, particularly crosslinked polymers, rapidly under ambient or mild conditions, particularly in the presence of oxygen.

SUMMARY

The present disclosure provides compositions, particularly flowable polymerizable compositions, that can cure (i.e., polymerize and/or crosslink) under ambient or mild conditions, particularly in the presence of oxygen (e.g., Oz or a peroxygen compound) to form solids, including viscoelastic solids. The compositions can be used to form adhesives, sealants, encapsulants, and potting resins, for example. Such compositions include an organoborane-base complex, especially those containing a trialkylborane, which can be used in the presence of oxygen or a peroxygen compound to initiate the curing (i.e., polymerization and/or crosslinking).

In a first aspect, the present disclosure provides a polymerizable composition that includes: an organoborane-base complex, wherein the base is a complexing agent selected from a compound having one or more amine groups, amidine groups, hydroxide groups, alkoxide groups, or a combination thereof; a decomplexing agent that liberates the organoborane from the organoborane base complex; a polymerizable thiol-containing component that includes at least one polymerizable thiol-containing compound having a plurality of thiol groups (i.e., mercapto groups) in which the sulfur atom of the thiol group is covalently bonded to carbon (i.e., through C—S bonds); and a polymerizable ethylenically unsaturated component that includes at least one polymerizable ethylenically unsaturated compound having a plurality of ethylenically unsaturated groups; wherein the total amount of the thiol-containing and ethylenically unsaturated compounds total at least 50% by weight of all polymerizable material in the composition. In certain embodiments, upon reaction (i.e., curing which involves polymerizing and/or crosslinking) a —C—S—C—C— linkage (e.g., a —CH$_2$—S—CH$_2$—CH$_2$— or —CHZ—S—CH$_2$—CH$_2$— linkage where Z is an organic group) is formed.

In a second aspect, the present disclosure provides a polymerizable composition that includes: a part A composition including an organoborane-base complex, wherein the base is a complexing agent selected from a compound having one or more amine groups, amidine groups, hydroxide groups, alkoxide groups, or a combination thereof; and a part B composition including a decomplexing agent that liberates the organoborane from the organoborane-base complex. The polymerizable composition further includes: a polymerizable thiol-containing component that includes at least one polymerizable thiol-containing compound having a plurality of thiol groups in which the sulfur atom of the thiol group is covalently bonded to carbon; and a polymerizable ethylenically unsaturated component that includes at least one polymerizable ethylenically unsaturated compound having a plurality of ethylenically unsaturated groups; wherein the total amount of the thiol-containing and ethylenically unsaturated compounds total at least 50% by weight of all polymerizable material in the composition. In certain embodiments, upon reaction a —C—S—C—C— linkage (e.g., a —CH$_2$—S—CH$_2$—CH$_2$— or —CHZ—S—CH$_2$—CH$_2$-linkage where Z is an organic group) is formed.

In a third aspect, the present disclosure provides a composition prepared by combining components that include: a part A composition including an organoborane-base complex, wherein the base is a complexing agent selected from a compound having one or more amine groups, amidine groups, hydroxide groups, alkoxide groups, or a combination thereof; and a part B composition including a decomplexing agent that liberates the organoborane from the organoborane-base complex. The part A composition and/or the part B composition further includes: a polymerizable thiol-containing component that includes at least one polymerizable thiol-containing compound having a plurality of thiol groups in which the sulfur atom of the thiol group is covalently bonded to carbon; and a polymerizable ethylenically unsaturated component that includes at least one polymerizable ethylenically unsaturated compound having a plurality of ethylenically unsaturated groups; wherein the total amount of the thiol-containing and ethylenically unsaturated compounds total at least 50% by weight of all polymerizable material in the composition. In certain embodiments, a —C—S—C—C— linkage (e.g., a —CH$_2$—S—CH$_2$—CH$_2$— or —CHZ—S—CH$_2$—CH$_2$— linkage where Z is an organic group) is formed.

In another aspect, the present disclosure provides a method of making a composition that includes combining components that include: a part A composition including an organoborane-base complex, wherein the base is a complexing agent selected from a compound having one or more amine groups, amidine groups, hydroxide groups, alkoxide groups, or a combination thereof; and a part B composition including a decomplexing agent that liberates the organoborane from the organoborane-base complex; and allowing the part A and the part B to react (preferably, to form a polymer that includes a —C—S—C—C— linkage (e.g., a —CH$_2$—S—CH$_2$—CH$_2$— or —CHZ—S—CH$_2$—CH$_2$— linkage where Z is an organic group)). The part A composition and/or the part B composition further includes: a polymerizable thiol-containing component that includes at least one polymerizable thiol-containing compound having a plurality of thiol groups in which the sulfur atom of the thiol group is covalently bonded to carbon; and a polymerizable ethylenically unsaturated component that includes at least one polymerizable ethylenically unsaturated compound having a plurality of ethylenically unsaturated groups; wherein the total amount of the thiol-containing and ethylenically unsaturated compounds total at least 50% by weight of all polymerizable material in the composition.

As used herein, the term "organic group" means a hydrocarbon group (with optional elements other than carbon and hydrogen, including oxygen, nitrogen, sulfur, phosphorus, halogen, and/or silicon). In some embodiments, the organic group does not include silicon. The organic group can be monovalent, divalent, trivalent, or any other desired valency. Example organic groups include an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass monovalent groups such as alkyl, alkenyl, and alkynyl groups, for example, as well as corresponding groups with higher valencies. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group"

means an unsaturated, linear or branched hydrocarbon group other than an aromatic group with one or more carbon-carbon double bonds, such as a vinyl group. The term "alkynyl group" means an unsaturated, linear or branched hydrocarbon group with one or more carbon-carbon triple bonds, such as an ethynyl group. The term "cyclic group" means a closed ring hydrocarbon group that is classified as a cycloaliphatic (i.e., alicyclic) group, aromatic group, or heterocyclic (e.g., oxygen-, nitrogen-, or sulfur-containing) group. The term "cycloaliphatic group" means a cyclic hydrocarbon group having properties resembling those of aliphatic groups. Cycloaliphatic groups include monovalent groups such as cycloalkyl groups (i.e., cyclic alkyl groups such as cyclopropyl, and cyclobutyl, for example, as well as corresponding groups with higher valencies). The term "aromatic group" or "aryl group" means a mono- or poly-nuclear aromatic hydrocarbon group. The term "heterocyclic group" means a closed ring hydrocarbon in which one or more of the atoms in the ring is an element other than carbon (e.g., nitrogen, oxygen, sulfur, etc.). Any of these groups may be substituted or unsubstituted. If substituted, the substituents may include halogen, hydroxy, alkoxy, alkylamino, alkyl, nitro, and the like. A group that may be the same or different is referred to as being "independently" something.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain situations by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Also, as used herein in connection with a measured quantity, the term "approximately" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

When a group is present more than once in a formula described herein, each group is "independently" selected, whether specifically stated or not. For example, when more than one R group is present in a formula, each R group is independently selected. Furthermore, subgroups contained within these groups are also independently selected.

As used herein, the term "room temperature" refers to a temperature of 19° C. to 25° C., or more often to a temperature of 21° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Compositions of the present disclosure include an organoborane-base complex, especially those containing a trialkylborane, that can be used in the presence of oxygen (e.g., $O_2$ or a peroxygen compound) to initiate the curing (polymerizing and/or crosslinking) of a flowable polymerizable composition to form solids, including viscoelastic solids.

In particular, the present disclosure provides a polymerizable composition that includes: an organoborane-base complex, wherein the base is a complexing agent selected from a compound having one or more amine groups, amidine groups, hydroxide groups, alkoxide groups, or a combination thereof; a decomplexing agent that liberates the organoborane from the organoborane-base complex; at least one polymerizable thiol-containing compound having a plurality of thiol groups (i.e., mercapto groups) in which the sulfur atom of the thiol group is covalently bonded to carbon; and at least one polymerizable ethylenically unsaturated compound having a plurality of ethylenically unsaturated groups. The thiol-containing and the ethylenically unsaturated compounds may be polydiorganosiloxanes, for example.

The curing reaction involves thiol-ene chemistry or the addition of a thiol group across carbon-carbon unsaturation, where the sulfur and hydrogen that add across an individual site of carbon-carbon unsaturation are not necessarily from the same thiol group, and the hydrogen may be from other compounds in addition to those that contain thiol groups. An organoborane-base complex, especially a trialkylborane-base complex, is used to initiate polymerizing and/or crosslinking reactions.

An organoborane, especially a trialkylborane, in the presence of oxygen or a peroxygen compound is used to initiate polymerizing and/or crosslinking reactions. The decomplexing agent reacts with the base to liberate the organoborane from the organoborane-base complex. In the presence of oxygen, the trialkylborane reacts with oxygen and subsequently fragments to generate free radical species some of which initiate the addition reaction of a thiol with an ethylenically unsaturated group. The compounds of the present invention undergo the reaction and afford polymeric materials, which are typically crosslinked polymeric materials. The polymers formed can be hydrocarbon-based or silicone-based. In certain embodiments, the polymers formed upon reaction include a —C—S—C—C— linkage (e.g., a —CH$_2$—S—CH$_2$—CH$_2$— or —CHZ—S—CH$_2$—CH$_2$— linkage where Z is an organic group).

In certain embodiments, the total amount of the thiol-containing and ethylenically unsaturated compounds total at least 50% by weight of all polymerizable material in the composition. In certain embodiments, the amount of the thiol groups and the amount of ethylenically unsaturated groups are present in a molar ratio range of 0.25:1.0 to 4.0:1.0, or 0.33:1.0 to 3.0:1.0, or 0.5:1.0 to 2.0:1.0, or 0.75:1.0 to 1.33:1.0, or 0.80:1.0 to 1.25:1.0 (thiol groups:ethylenically unsaturated groups). In certain embodiments, for example where crosslinking of high molecular weight polymers that contain an ethylenically unsaturated repeating unit, such as 1,2-polybutadiene or unsaturated polyesters, is desired, the amount of thiol groups and the amount of ethylenically unsaturated groups may be present in a molar range of 0.005:1.0 to 0.20:1.0 (thiol groups:ethylenically unsaturated groups).

The compositions of the present disclosure typically include at least two parts (i.e., they are multi-part polymerizable compositions), and preferably, two parts. The at least two-part compositions according to the present disclosure include a part A and a part B. Individually, parts A and B have good stability, but when combined stability is lost and curing is initiated.

The part A composition includes an organoborane-base complex. The part B includes a decomplexing agent for the organoborane-base complex. The polymerizable composition (i.e., the part A composition and/or the part B composition) further includes: a thiol-containing component that includes at least one polymerizable thiol-containing compound having a plurality of thiol groups in which the sulfur atom of the thiol group is covalently bonded to carbon; and an ethylenically unsaturated component that includes at least one polymerizable ethylenically unsaturated compound having a plurality of ethylenically unsaturated groups. That is, the thiol-containing component is in part A, part B, and/or another part distinct from parts A and B; and the ethylenically unsaturated component is in part A, part B, and/or another part distinct from parts A and B. In certain embodiments, the thiol-containing compound and the ethylenically unsaturated compound are separate and distinct compounds. In certain embodiments, one compound may have both thiol functional groups and ethylenically unsaturated groups.

Organoborane-Base Complex

The organoborane-base complex is a latent form of an organoborane which is liberated upon decomplexing the base with a compound that reacts with the base, such as an acid or its equivalent. The free organoborane is an initiator capable of initiating free-radical polymerization of polymerizable monomer(s) to form a polymer that can be useful as an adhesive, sealant, encapsulant, and potting resin, for example.

The organoborane portion of the organoborane-base complex is of the following formula (Formula I):

$$B(R^1)(R^2)(R^3) \qquad (I)$$

wherein $R^1$, $R^2$, and $R^3$ are organic groups (typically having 30 atoms or less, or 20 atoms or less, or 10 atoms or less). In certain embodiments of Formula I, $R^1$ represents an alkyl group having from 1 to 10 carbon atoms, or from 1 to 6 carbon atoms, or from 1 to 5 carbon atoms, or from 1 to 4 carbon atoms, or from 2 to 4 carbon atoms, or from 3 to 4 carbon atoms.

In certain embodiments of Formula I, $R^2$ and $R^3$ independently represent (i.e., they may be the same or different): alkyl groups having 1 to 10 carbon atoms (or from 1 to 6 carbon atoms, or from 1 to 5 carbon atoms, or from 1 to 4 carbon atoms, or from 2 to 4 carbon atoms, or from 3 to 4 carbon atoms); cycloalkyl groups having 3 to 10 carbon atoms; aryl groups having from 6 to 12 carbon atoms (e.g., phenyl); or aryl groups having from 6 to 12 carbon atoms (e.g., phenyl) substituted with alkyl groups having 1 to 10 carbon atoms (or from 1 to 6 carbon atoms, or from 1 to 5 carbon atoms, or from 1 to 4 carbon atoms, or from 2 to 4 carbon atoms, or from 3 to 4 carbon atoms), or cycloalkyl groups having 3 to 10 carbon atoms. Any two of $R^1$, $R^2$, and $R^3$ groups may optionally be part of a ring (e.g., two groups can combine to form a ring).

The organoborane initiator is complexed with a basic complexing agent (i.e., a base that complexes with the organoborane) to form a stable organoborane-base complex. The organoborane-base complex may be represented by the formula (Formula II):

(II)

wherein: Cx represents a complexing agent selected from a compound having one or more amine groups, one or more amidine groups, one or more hydroxide groups, one or more alkoxide groups, or a combination thereof; and v is a positive number. The value of v is selected so as to render the organoborane-base complex stable under ambient conditions. For example, when the organoborane-base complex is stored in a capped vessel at about 20 to 22° C. and under otherwise ambient conditions (i.e., the vessel is capped in an ambient air environment and not under vacuum or an inert atmosphere), the complex remains useful as an initiator for at least two weeks. Preferably, the complexes may be readily stored under these conditions for many months, and up to a year or more. In certain embodiments the value of v is typically at least 0.1, or at least 0.3, or at least 0.5, or at least 0.8, or at least 0.9 and is often up to 4, or up to 3, or up to 2, or up to 1.5, or up to 1.2. In some embodiments, v is in a range of 0.1 to 4, or in a range of 0.5 to 2, or in a range of 0.8 to 1.2, or in a range of 0.9 to 1.1, or 1.

In certain embodiments of Formula II, $R^4$ represents an alkyl group having from 1 to 10 carbon atoms, or from 1 to 6 carbon atoms, or from 1 to 5 carbon atoms, or from 1 to 4 carbon atoms, or from 2 to 4 carbon atoms, or from 3 to 4 carbon atoms.

In certain embodiments of Formula II, $R^5$ and $R^6$, independently represent (i.e., they may be the same or different): alkyl groups having 1 to 10 carbon atoms (or from 1 to 6 carbon atoms, or from 1 to 5 carbon atoms, or from 1 to 4 carbon atoms, or from 2 to 4 carbon atoms, or from 3 to 4 carbon atoms); cycloalkyl groups having 3 to 10 carbon atoms; aryl groups having from 6 to 12 carbon atoms (e.g., phenyl); or aryl groups having from 6 to 12 carbon atoms (e.g., phenyl) substituted with alkyl groups having 1 to 10 carbon atoms (or from 1 to 6 carbon atoms, or from 1 to 5 carbon atoms, or from 1 to 4 carbon atoms, or from 2 to 4 carbon atoms, or from 3 to 4 carbon atoms), or cycloalkyl groups having 3 to 10 carbon atoms. Any two of $R^4$, $R^5$, and $R^6$ groups may optionally be part of a ring (e.g., two groups can combine to form a ring).

Herein, in Formulas I and II, an alkyl group may be straight chain or branched.

In certain embodiments, a ring formed by two groups of $R^1$, $R^2$, and $R^3$ or formed by two groups of $R^4$, $R^5$, and $R^6$ may be bridged by the boron atom in Formula I or Formula II.

In certain embodiments of Formula II, $R^4$ represents an alkyl group having from 1 to 10 carbon atoms; $R^5$ and $R^6$ independently represent alkyl groups having 1 to 10 carbon atoms or aryl groups having 6 to 12 carbon atoms; Cx represents a complexing agent selected from a compound having one or more amine groups, amidine groups, hydroxide groups, alkoxide groups, or a combination thereof; and v is a positive number such as in a range of 0.1 to 4, in a range of 0.5 to 2, in a range of 0.8 to 1.2, or 0.9 to 1.1, or 1.

In certain embodiments, the organoborane-base complex does not include a thiol group.

Among preferred organoboranes of the organoborane-base complexes are trimethylborane, triethylborane, tri-n-propylborane, tri-isopropylborane, tri-n-butylborane, tri-isobutylborane, and tri-sec-butylborane.

Useful basic complexing agents (Cx) include, for example, amines, amidines, hydroxides, and/or alkoxides. Sufficient complexing agent is provided to ensure stability of the organoborane-base complex under ambient conditions. Insufficient complexing agent could leave free organoborane, a material that tends to be pyrophoric. In practice, to ensure stability of the complex at ambient conditions, the compound that serves as the complexing agent is often in excess, i.e., some of the compound is free or not complexed in the composition. The amount of excess basic complexing agent is chosen to ensure stability of the complex under ambient conditions while still achieving desired performance such as cure rate of the polymerizable composition and mechanical properties of the cured composition. For example, there may be up to 100 percent molar excess, or up to 50 percent molar excess, or up to 30 percent molar excess of the basic complexing agent relative to the organoborane. Often, there is 10 to 30% molar excess of the basic complexing agent relative to the organoborane.

Useful basic complexing agents include, for example, amine compounds, amidine compounds, hydroxides, alkoxides, or combinations thereof. The amine compounds have a primary amine group and/or a secondary amine group. The amidine compounds have an amidine group. The hydroxides are salts having hydroxide groups such as shown in Formula (VIII) below. The alkoxides are salts having alkoxide groups such as shown in Formula (VIII) below.

Amine complexing agents (Cx) may be provided by a wide variety of materials having one or more primary or secondary amine groups, including blends of different amines Amine complexing agents may be a compound with a single amine group or may be a polyamine (i.e., a material having multiple amine groups such as two or more primary, secondary, or tertiary amine groups). Suitable polyamines have at least one amine group that is a primary and/or secondary amine group.

In one embodiment, the amine complexing agent may be a primary or secondary monoamine represented by the following formula (Formula III):

wherein: $R^7$ and $R^8$ are independently selected from the group consisting of hydrogen, and organic groups, preferably alkyl groups having 1 to 10 carbon atoms, alkylcycloalkyl groups (i.e., an alkyl substituted with an cycloalkyl or a cycloalkyl substituted with an alkyl), alkylaryl (i.e., an alkyl substituted with an aryl) groups in which the amine group is not directly attached to the aryl structure, and polyoxyalkylene groups. The organic groups may include substituents, particularly hydroxyl or alkoxy substituents. Alternatively, $R^7$ and $R^8$ together with the nitrogen atom to which they are attached may be joined to form a 4 to 7-membered heterocyclic ring. The heterocyclic ring can include additional heteroatoms such as oxygen, sulfur, or nitrogen in addition to the nitrogen atom joining $R^7$ and $R^8$. In some embodiments, the complexing agent of Formula (III) is a primary amine (i.e., one but not both of $R^7$ or $R^8$ is hydrogen). Particular examples of amines of Formula (III) include ammonia, ethylamine, butylamine, hexylamine, octylamine, benzylamine, piperidine, pyrrolidine, 3-methoxypropylamine, and polyoxyalkylene monoamines (e.g., as marketed under the trade designation JEFFAMINE by Huntsman Corp., Salt Lake City, Utah). Specific examples include JEFFAMINE M715 and JEFFAMINE M2005 polyoxyalkylene monoamines.

In another embodiment, the amine may be a polyamine such as those represented by the following formula (Formula IV):

wherein: $R^7$ and $R^8$ are as defined above and $R^9$ is a divalent organic group, preferably a divalent alkylene, cycloalkylene, alkylene-arylene-alkylene, or alkylene-heterocyclic-alkylene group. An alkylene refers to a divalent radical of an alkane and typically has 1 to 10 carbon atoms. An arylene refers to a divalent radical of an aromatic group and often has 6 to 12 carbon atoms. Examples of arylene groups include phenylene and diphenylene. The divalent organic group $R^9$ can optionally include a group of formula —$NR^a$—, an oxy group, a carbonyl group, or a combination thereof between two alkylene groups. Group $R^a$ is typically hydrogen or an alkyl group. Preferably, compounds of Formula (IV) have at least one primary amine group.

Examples of these polyamines are dimethylaminopropylamine, and aminopropylmorpholine.

Still other suitable polyamines are alkanediamines, which may be branched or linear, and having the following formula (Formula V):

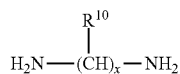
(V)

wherein: x is a whole number greater than or equal to 1, more preferably 2 to 12, and each $R^{10}$ is independently a hydrogen or an alkyl group. Examples of alkanediamines include 1,2-ethanediamine, 1,3-propanediamine, 1,5-pentanediamine, 1,6-hexanediamine, 1,12-dodecanediamine, 2-methyl-1,5-pentanediamine, and 3-methyl-1,5-pentanediamine.

Still other amine complexing agents are various alkanepolyamines having three or more amine groups such as, for example, triethylenetetramine or diethylenetriamine, or compounds having a heterocyclic group such as, for example, 4-(dimethylamino)pyridine.

Other useful polyamines also include polyoxyalkylenepolyamines. Suitable polyoxyalkylenepolyamines are reported, for example, in U.S. Pat. No. 5,621,143 (Pocius). Preferred polyoxyalkylenepolyamines may be represented by the following formulae (Formula VI and Formula VII):

$$H_2NR^{11}O(R^{12}O)_w(R^{13}O)_u(R^{12}O)_yR^{11}NH_2 \quad (VI)$$

(i.e., polyoxyalkylenediamines); or $$[H_2NR^{11}O(R^{12}O)_w]_zR^{14} \quad (VII)$$

wherein: $R^{11}$, $R^{12}$, and $R^{13}$ represent alkylene groups (i.e., an alkylene is a divalent radical of an alkane) having 1 to 10 carbon atoms, which may be the same or may be different. In certain embodiments, $R^{11}$ is an alkylene group having 2 to 4 carbon atoms such as ethylene, n-propylene, isopropylene, n-butylene or isobutylene. In certain embodiments, $R^{12}$ and $R^{13}$ are alkylene groups having 2 or 3 carbon atoms such as ethylene, n-propylene, or isopropylene. The $R^{14}$ group is a z-valent organic group (e.g., a residue of a polyol used to prepare the polyoxyalkylenepolyamine), preferably having from 1 to 18 carbon atoms. The $R^{14}$ group may be branched or linear, and substituted or unsubstituted (although substituents should preferably not interfere with oxyalkylation reactions). The value of w is typically greater than or equal to 1, or, in certain embodiments, 1 to 50, or 1 to 20. The values of u and y are typically both greater than or equal to 0. The value of z is typically greater than or equal to 2, or, in certain embodiments, 3 or 4 (so as to provide, respectively, polyoxyalkylenetriamines and polyoxyalkylenetetraamines). It is preferred that the values of w, u, y, and z be chosen such that the resulting complex is a liquid at room temperature, as this simplifies handling and mixing thereof.

Usually, the polyoxyalkylenepolyamine is itself a liquid. For the polyoxyalkylenepolyamine, molecular weights of less than 5000 grams/mole may be used, although molecular weights of 1000 grams/mole or less are more preferred, and molecular weights of 140 to 1000 grams/mole are most preferred. Examples of polyoxyalkylenepolyamines include, but are not limited to, poly(ethylene oxide)diaamine, poly (propylene oxide)diamine, poly(propylene oxide)triamine, diethylene glycol dipropylamine, triethylene glycol dipropylamine, poly(tetramethylene oxide)diamine, poly(ethylene oxide-co-propylene oxide)diamine, and poly(ethylene oxide-co-propylene oxide)triamine. Examples of suitable commercially available polyoxyalkylenepolyamines include those marketed under the trade designation JEFFAMINE by Huntsman Corporation such as the D-, ED-, and EDR-series diamines (e.g., D-400, D-2000, D-5000, ED-600, ED-900, ED-2001, and EDR-148), and the T-series triamines (e.g., T-403), as well as DCA-221 from Dixie Chemical Co., Pasadena, Tex.

As reported in U.S. Pat. No. 5,616,796 (Pocius et al.), the polyamine may also include the condensation reaction product of diprimary-amine-terminated material (i.e., the two terminal groups are primary amine groups) and one or more materials containing at least two groups that are reactive with primary amines.

In certain embodiments, the amine may be an aziridine. Aziridines are not preferred, however, because there may be stability issues with such compounds.

Suitable hydroxide and/or alkoxide complexing agents (Cx) are reported, for example, in U.S. Pat. No. 6,486,090 (Moren). Preferred hydroxide and/or alkoxide complexing agents may be represented by the formula (Formula VIII):

$$(R^{15}O^{(-)})_nM^{(m+)} \quad (VIII)$$

wherein: $R^{15}$ is independently selected from hydrogen or an organic group (e.g., alkyl group); $M^{(m+)}$ represents a countercation with a charge m+(e.g., sodium, potassium, tetraalkylammonium, or combinations thereof); n is an integer greater than zero such as 1 to 6 or 1 to 4 or 1 to 3; and m is an integer greater than zero such as 1 to 6 or 1 to 4 or 1 to 3. Preferably, the variables n and m are equal.

"Amidines" are compounds having at least one N=C—N unit in its structure. Exemplary amidine complexing agents (Cx) are reported in U.S. Pat. No. 6,410,667 (Moren). Other amidine complexing agents include, for example, N,N,N,N'-tetramethylguanidine; 1,8-diazabicyclo[5.4.0]undec-7-ene; 1,5-diazabicyclo[4.3.0]non-5-ene; 2-methylimidazole; and 2-methylimidazoline.

The organoborane-base complex may be readily prepared using known techniques, as described, for example, in U.S. Pat. No. 5,616,796 (Pocius et al.), U.S. Pat. No. 5,621,143 (Pocius), U.S. Pat. No. 6,252,023 (Moren), U.S. Pat. No. 6,410,667 (Moren), and U.S. Pat. No. 6,486,090 (Moren).

Organoborane-amine complexes are available from suppliers such as BASF and AkzoNobel. TEB-DAP (triethylborane-1,3-diaminopropane (or 1,3-propanediamine) complex), TnBB-MOPA (tri-n-butylborane-3-methoxypropylamine) complex, TEB-DETA (triethylborane-diethylenetriamine) complex, TnBB-DAP (tri-n-butylborane-1,3-diaminopropane complex), and TsBB-DAP (tri-sec-butylborane-1,3-diaminopropane) are all available from BASF (Ludwigshafen, Germany). TEB-HMDA (triethylborane-hexamethylene diamine (or 1,6-hexanediamine or 1,6-diaminohexane) complex) is available from AkzoNobel (Amsterdam, The Netherlands).

The organoborane-base complex is generally employed in an effective amount, which is an amount large enough to permit reaction (i.e., curing by polymerizing and/or cross-linking) to readily occur to obtain a polymer of sufficiently high molecular weight for the desired end use. If the amount of organoborane produced is too low, then the reaction may be incomplete. On the other hand, if the amount is too high, then the reaction may proceed too rapidly to allow for effective mixing and use of the resulting composition. Useful rates of reaction will typically depend at least in part on the method of applying the composition to a substrate. Thus, a faster rate of reaction may be accommodated by using a high speed automated industrial applicator rather than by applying the composition with a hand applicator or by manually mixing the composition.

Within these parameters, an effective amount of the organoborane-base complex is an amount that preferably provides at least 0.003 percent by weight of boron, or at least 0.008 percent by weight of boron, or at least 0.01 percent by weight of boron. An effective amount of the organoborane-base complex is an amount that preferably provides up to 1.5 percent by weight of boron, or up to 0.5 percent by weight of boron, or up to 0.3 percent by weight of boron. The percent by weight of boron in a composition is based on the total weight of the polymerizable material.

Alternatively stated, an effective amount of the organoborane-base complex is at least 0.1 percent by weight, or at least 0.5 percent by weight. An effective amount of the organoborane-base complex is up to 10 percent by weight, or up to 5 percent by weight, or up to 3 percent by weight. The percent by weight of boron in a composition is based on the total weight of the polymerizable material.

Decomplexing Agents

As used herein, the term "decomplexing agent" refers to a compound capable of liberating the organoborane from its complexing agent, thereby enabling initiation of the reaction (curing by polymerizing and/or crosslinking) of the polymerizable material of the composition. Decomplexing agents may also be referred to as "activators" or "liberators" and these terms may be used synonymously herein. The choice of decomplexing agent typically depends on the specific organoborane-base complex used.

Compounds that react quickly with the base or the organoborane-base complex under mild temperatures are particularly effective decomplexing agents. These may include mineral acids, Lewis acids, carboxylic acids, acid anhydrides, acid chlorides, sulfonyl chlorides, phosphonic acids, isocyanates, aldehydes, 1,3-dicarbonyl compounds, acrylates, and epoxies.

In certain embodiments, the decomplexing agent may be attached to solid particles such as silica, titanium dioxide, alumina, calcium carbonate, and carbon black.

In certain embodiments, if the organoborane is complexed with an amine, a suitable decomplexing agent is an amine-reactive compound. The amine-reactive compound liberates organoborane by reacting with the amine, thereby removing the organoborane from chemical attachment with the amine. A wide variety of materials may be used to provide the amine-reactive compound including combinations of different materials. Desirable amine-reactive compounds are those materials that can readily form reaction products with amines at or below room temperature so as to provide a composition such as an adhesive that can be easily used and cured under ambient conditions.

General classes of useful amine-reactive compounds include mineral acids (e.g., hydrochloric acid, sulfuric acid, phosphoric acid, and silicic acid), Lewis acids (e.g., $SnCl_4$ or $TiCl_4$), carboxylic acids, acid anhydrides (i.e., organic compounds that have two acyl groups bound to the same oxygen atom), acid chlorides, sulfonyl chlorides, phosphonic acids, phosphinic acids, isocyanates, aldehydes, 1,3-dicarbonyl compounds, acrylates, and epoxies. Compounds that react quickly with amines at mild temperatures, such as acids, acid anhydrides, acid chlorides, sulfonyl chlorides, and isocyanates, are particularly effective decomplexing agents. Since the thiol group is also reactive with some of these compounds, care should be taken in the separation of reactive components into different parts of the 2-part compositions.

Since the concentration of thiol groups is often greater than the concentration of primary or secondary amines in the basic complexing agent, proper selection of the decomplexing agent is desired for proper cure of the composition. In addition, strong acids, such as many mineral acids, may degrade the components of the polymerizable composition before or after reaction, and also can degrade or corrode substrates that the composition may contact. Many Lewis acids are quite reactive with thiol groups, and generate strong acids upon reaction with thiols or water (moisture) that can lead to degradation or corrosion. Owing to these facts, carboxylic acids, acid anhydrides, aldehydes, isocyanates, phosphonic acids, and 1,3-dicarbonyl compounds, such as barbituric acid, dimedone, and their derivatives, are the more versatile and preferred decomplexing agents.

Useful carboxylic acids include those having the general formula $R^{19}$—$CO_2H$, wherein $R^{19}$ represents hydrogen or a monovalent organic group. Preferably $R^{19}$ is an aliphatic group having 1 to 20 (preferably 1 to 8) carbon atoms, or an aryl group having 6 to 10 (preferably 6 to 8) carbon atoms. The aliphatic groups may comprise a straight chain or they may be branched, and may be saturated or unsaturated. The aryl groups may contain substituents such as alkyl, alkoxy, or halogen groups. Suitable acids of this type include acrylic acid, methacrylic acid, acetic acid, nonanoic acid, benzoic acid, and p-methoxybenzoic acid.

Useful carboxylic acids also include those having the general formula $R^{20}$—$CO_2H$, wherein $R^{20}$ may be a straight or branched chain, saturated or unsaturated aliphatic group of from 9 to 36 carbon atoms, preferably from 11 to 24 carbon atoms, and more preferably from 15 to 24 carbon atoms. Yet other carboxylic acids useful as the amine-reactive compound include dicarboxylic acids and carboxylic acid esters. Such compounds may be represented by the following formula (Formula IX):

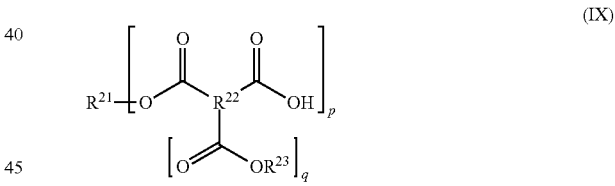

(IX)

wherein: $R^{21}$ is hydrogen, a monovalent organic group (typically having 18 atoms or less, or 8 atoms or less), or a multivalent organic group (typically having 30 atoms or less, or 10 atoms or less). The $R^{22}$ group is a multivalent (i.e., (q+2)-valent) organic group (typically having 8 atoms or less, or 4 atoms or less). The $R^{23}$ group is hydrogen or a monovalent organic group (typically having 18 atoms or less, or 8 atoms or less). The value of q is 0, 1, or 2, and the value of p is greater than or equal to one, preferably 1 to 4, more preferably 1 or 2.

In some embodiments, the carboxylic acids can be represented by the formula (Formula X):

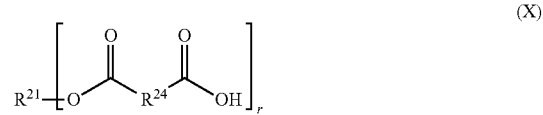

(X)

wherein: $R^{21}$ is as defined above and r is greater than or equal to one, preferably 1 to 4, more preferably 1 or 2. The $R^{24}$ group is a single bond or a divalent organic group (preferably having from 1 to 40 carbon atoms, more preferably from 1 to 10 carbon atoms or 1 to 6 carbon atoms). The organic group is often an alkylene or alkene-diyl (divalent radical of an alkene) or an arylene. When $R^{21}$ is hydrogen and r is one, the resulting compounds of Formula (X) are dicarboxylic acids. In some embodiments, $R^{21}$ is an alkyl and r is equal to 1. In other embodiments, $R^{21}$ is an alkylene and r is equal to 2. Useful dicarboxylic acids include oxalic acid, malonic acid, succinic acid, glutaric acid, adipic acid, maleic acid, fumaric acid, phthalic acid, isophthalic acid, terephthalic acid, and dimer acid.

Other useful monofunctional or polyfunctional carboxylic acids are those that contain thioester groups or amide groups, and those that are reactive via thiol-ene chemistry, such as thioglycolic acid, 3-mercaptopropanoic acid, and the previously mentioned (meth)acrylic acid.

Polydiorganosiloxanes that contain carboxylic acid groups are also useful, such as Shin-Etsu Chemical Co. Ltd. X-22-3710 that has a carboxylic acid group at one of the terminal ends of the silicone chain, and X-22-162C that has a carboxylic acid group at each of the two termini, when the polyfunctional thiol and ethylenically unsaturated compounds are polydiorganoxiloxanes.

Compounds that easily generate carboxylic acids upon reaction with water or moisture, i.e., are easily hydrolyzed by water to form carboxylic acids, such as vinyltriacetoxysilane and (meth)acryloxypropyltriacetoxysilane are also useful.

Also preferred as amine-reactive compounds that can serve as decomplexing agents are materials having at least one anhydride group, such materials preferably represented by one of the following formulae (Formula XI and Formula XII):

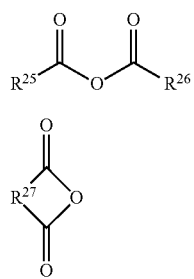

wherein: $R^{25}$ and $R^{26}$ are organic groups which independently may be aliphatic, cycloaliphatic, or aromatic. Preferred aliphatic and cycloaliphatic groups include 1 to 17 carbon atoms, more preferably 2 to 9 carbon atoms. The aliphatic and cycloaliphatic groups can be saturated or unsaturated. Preferred aromatic groups include phenyl, optionally substituted with 1 to 4 carbon atom aliphatic groups. The $R^{27}$ group is a divalent organic group that completes a cyclic structure with the anhydride group to form, for example, a 5- or 6-membered ring. $R^{27}$ may be aliphatic, cycloaliphatic, aromatic, or a combination. The aliphatic and cycloaliphatic groups can be saturated or unsaturated. Preferably $R^{27}$ is an aliphatic group having 2 to 20, more preferably 2 to 12 carbon atoms. The $R^{27}$ group may also contain heteroatoms such as oxygen or nitrogen provided that any heteroatom is not adjacent to the anhydride functionality. The $R^{27}$ group may also be part of a cycloaliphatic or aromatic fused ring structure, either of which may be optionally substituted with aliphatic groups. $R^{27}$ may be substituted with one or more carboxylic acid groups, any two of which, when on adjacent carbons (i.e., covalently bonded carbons) can be cyclized to form another anhydride group.

Suitable anhydrides of Formula (XI) are propionic anhydride, methacrylic anhydride, hexanoic anhydride, decanoic anhydride, lauric anhydride, and benzoic anhydride. Suitable anhydrides of Formula (XII) are maleic anhydride, succinic anhydride, methylsuccinic anhydride, 2-octen-1-ylsuccinic anhydride, 2-dodecen-1-ylsuccinic anhydride, dodecenylsuccinic anhydride (mixture of isomers), cyclohexanedicarboxylic anhydride, cis-5-norbornene-endo-2,3-dicarboxylic anhydride, methyl-5-norbornene-2,3-dicarboxylic anhydride, phthalic anhydride, trimellitic anhydride, and pyromellitic anhydride. The presence of an ethylenically unsaturated group in the anhydride-functional amine reactive compound, such as would be the case for maleic anhydride, may permit the same to react with the other thiol-containing or ethylenically unsaturated components.

Other useful amine-reactive compounds having at least one anhydride group are copolymers of maleic ahydride, such as the copolymers of maleic anhydride and styrene, the copolymers of maleic anhydride and ethylene or -olefins, and the copolymers of maleic anhydride and (meth)acrylates. Also, polymeric materials in which maleic anhydride has been grafted onto the polymer to form, for example, succinic anhydride-functional polymers are suitable. Polydiorganosiloxanes that contain anhydrides are also useful, such as Gelest, Inc. succinic anhydride-terminated polydimethylsiloxane, DMS-Z21, when the polyfunctional thiol and ethylenically unsaturated compounds are polydiorganosiloxanes.

Suitable aldehydes useful as the amine-reactive compounds that serve as decomplexing agents may include those represented by the formula (Formula XIII):

wherein: $R^{28}$ is a monovalent organic group such as, for example, an alkyl group having 1 to 10 carbon atoms (in some embodiments, 1 to 4 carbon atoms), or an aryl group having 6 to 10 carbon atoms (in some embodiments, 6 to 8 carbon atoms). In this formula, the alkyl groups may be straight or branch-chained, and may contain substituents such as halogen, hydroxy, and alkoxy. The aryl groups may contain substituents such as halogen, hydroxy, alkoxy, alkyl, and nitro. One preferred $R^{28}$ group is aryl. Exemplary compounds of this type include: benzaldehyde; o-, m- and p-nitrobenzaldehyde; 2,4-dichlorobenzaldehyde; p-tolylaldehyde; and 3-methoxy-4-hydroxybenzaldehyde. Blocked aldehydes such as acetals and dialdehydes, may also be used.

Other suitable decomplexing agents may include 1,3-dicarbonyl compounds (e.g., beta-ketones), for example, as described in U.S. Pat. No. 6,849,569 (Moren). Exemplary 1,3-dicarbonyl compound decomplexing agents include methyl acetoacetate, ethyl acetoacetate, t-butyl acetoacetate, 2-methacryloyloxyethyl acetoacetate, diethylene glycol bis (acetoacetate), polycaprolactone tris(acetoacetate), polypropylene glycol bis(acetoacetate), poly(styrene-co-allyl acetoacetate), N,N-dimethylacetoacetamide, N-methylacetoacetamide, acetoacetanilide, ethylene bis(acetoacetamide), polypropylene glycol bis(acetoacetamide), acetoacetamide, and acetoacetonitrile. Preferable 1,3-dicarbonyl compounds are dimedone, barbituric acid and their derivatives (e.g., 1,3-dimethyl barbituric acid, 1-phenyl-5-benzyl barbituric acid, and 1-ethyl-5-cyclohexyl barbituric acid).

Examples of suitable isocyanate decomplexing agents include, but are not limited to, polyfunctional isocyanates, such as isophorone diisocyanate, hexamethylenediisocyanate, methylene diphenyl diisocyanate, toluene diisocyanate, and their prepolymers. Additionally, 2-isocyanatoethyl methacrylate alone or its copolymers with, e.g., other (meth)acrylates are suitable decomplexing agents.

Examples of suitable phosphonic acid decomplexing agents include vinylphosphonic acid, phenylphosphonic acid, methylphosphonic acid, and octadecylphosphonic acid.

Preferred compounds capable of decomplexing the organoborane-amine complex include, for example, a carboxylic acid, an acid anhydride, an aldehyde, an isocyanate, a phosphonic acid, or a 1,3-dicarbonyl.

In the cases when the organoborane is complexed to an amidine, alkoxide, or hydroxide, suitable decomplexing agents are the same as described above for amine complexing agents. When the organoborane is complexed to an alkoxide, hydroxide, or amidine, which is protic, i.e. at least one of the nitrogen atoms are substituted with hydrogen, the preferred decomplexing agents include, for example, a carboxylic acid, an acid anhydride, an isocyanate, a phosphonic acid, or a 1,3-dicarbonyl. When the organoborane is complexed to an amidine, which is aprotic (i.e. none of the nitrogen atoms are substituted with hydrogen), the preferred decomplexing agents include, for example, a carboxylic acid, an acid anhydride, a phosphonic acid, or a 1,3-dicarbonyl.

The decomplexing agent is typically used in an effective amount (i.e., an amount effective to promote reaction (i.e., curing by polymerizing and/or crosslinking) by liberating the initiator from its complexing agent, but without materially adversely affecting desired properties of the ultimate composition). As recognizable to one of ordinary skill in the art, too much of the decomplexing agent may cause reaction to proceed too quickly. However, if too little decomplexing agent is used, the rate of reaction may be too slow and the resulting polymers may not be of adequate molecular weight for certain applications. A reduced amount of decomplexing agent may be helpful in slowing the rate of reaction if it is otherwise too fast. Thus, within these parameters, the decomplexing agent is typically provided in an amount such that the molar ratio of amine-, amidine-, hydroxide-, or alkoxide-reactive groups in the decomplexing agent(s) to amine, amidine, hydroxide or alkoxide groups in the complexing agent(s) is in the range of 0.5:1.0 to 10.0:1.0. For better performance, preferably the ratio of amine-, amidine-, hydroxide-, or alkoxide-reactive groups in the decomplexing agent(s) to amine, amidine, hydroxide, or alkoxide groups in the complexing agent(s) is in the range of 0.5:1.0 to 4.0:1.0, preferably 1.0:1.0.

Polymerizable Ethylenically Unsaturated Compounds

Suitable polymerizable ethylenically unsaturated compounds are those compounds (e.g., monomer, oligomer, polymerizable polymer) that include a plurality of ethylenically unsaturated groups. Such compounds are often referred to as "polyfunctional".

Many types of ethylenically unsaturated groups are feasible including internal and terminal ethylenically unsaturated groups. However, the unsaturation associated with aromaticity, e.g., in a benzene ring is not suitable. Alkenyl and alkynyl groups are useful. The groups can be unconjugated or conjugated with other carbon-carbon, carbon-oxygen, or carbon-nitrogen unsaturation, such as in the case of 1,3-dienes, fumarate esters, and maleate esters.

In general, terminal ethylenically unsaturated groups, such as vinyl, allyl, and ethynyl groups, are more reactive and, thus, preferred when relatively fast cure rates are desired under ambient conditions (the exception being norbornenes, which are highly reactive, and maleimides, which are moderately reactive, thus, also preferred). Preferred ethylenically unsaturated compounds include vinyls, allyls, ethynyls, norbornenyls, and maleimides. Vinyls include, but are not limited to, vinyl ethers, vinyl silicones (i.e., polydiorganosiloxanes with vinyl groups covalently bonded to silicon), N-vinyl amides, vinyl aliphatics (such as 1,9-decadiene), vinyl aromatics (such as divinylbenzene), vinyl esters, (meth)acrylates, and (meth)acrylamides. Allyls include, but are not limited to, allyl ethers, allyl esters, allyl carbamates, allyl amines, allyl amides (which include allyl imides, allyl isocyanurates, and allyl ureas), allyl cyanurates, and allyl triazines.

Exemplified polyfunctional ethylenically unsaturated compounds include vinyl ethers, vinyl silicones, vinyl aliphatics, (meth)acrylates, allyl ethers, allyl esters, and allyl amides (allyl isocyanurate).

Suitable polyfunctional allyl ethers include trimethylolpropane diallyl ether, pentaerythritol tetraallyl ether (also referred to as allyl pentaerythritol), dipentaerythritol hexaallyl ether, trimethylolpropane triallyl ether, ethylene glycol diallyl ether, and diethylene glycol diallyl ether.

Suitable polyfunctional allyl amides (i.e., N-allyl amides) include N,N'-diallyltartramide, 1,3-diallyl urea, and triallyl isocyanurate, as well as N,N'-diallylamides synthesized from allylamine and dicarboxylic acids or their acid chlorides, and N,N-diallylamides synthesized from diallylamine and carboxylic acids or their acid chlorides. Preferred polyfunctional allyl amide is triallyl isocyanurate.

Suitable ethylenically unsaturated compounds include polyfunctional (meth)acrylate monomers. As used herein the terms "(meth)acrylate" and "(meth)acrylic" and the plural forms thereof are meant to include acrylate and/or methacrylate species of the designated compound. For example, the term "ethyl (meth)acrylate" is meant to include ethyl acrylate and/or ethyl methacrylate. Suitable (meth)acrylic acid derivatives are, for example, the (meth)acrylic esters of polyhydric alcohols.

Suitable di(meth)acrylates include 1,3-butylene glycol di(meth)acrylate, 1,4-butanediol di(meth)acrylate, 1,6-hexanediol di(meth)acrylate, 1,6-hexanediol mono acrylate monomethacrylate, ethylene glycol di(meth)acrylate, alkoxylated aliphatic di(meth)acrylate, alkoxylated cyclohexanedimethanol di(meth)acrylate, alkoxylated hexanediol di(meth)acrylate, alkoxylated neopentyl glycol di(meth)acrylate, caprolactone modified neopentyl glycol hydroxypivalate di(meth)acrylate, cyclohexanedimethanol di(meth)acrylate, diethylene glycol di(meth)acrylate, dipropylene glycol di(meth)acrylate, ethoxylated (10) bisphenol A di(meth)acrylate, ethoxylated (3) bisphenol A di(meth)acrylate, ethoxylated (30) bisphenol A di(meth)acrylate, ethoxylated (4) bisphenol A di(meth)acrylate, ethoxylated (4) bisphenol A di(meth)acrylate, hydroxypivalaldehyde modified trimethylolpropane di(meth)acrylate, neopentyl glycol di(meth)acrylate, polyethylene glycol (200) di(meth)acrylate, polyethylene glycol (400) di(meth)acrylate, polyethylene glycol (600) di(meth)acrylate, propoxylated neopentyl glycol di(meth)acrylate, tetraethylene glycol di(meth) acrylate, tricyclodecanedimethanol di(meth)acrylate, triethylene glycol di(meth)acrylate, and tripropylene glycol di(meth)acrylate.

Suitable tri(meth)acrylates include glycerol tri(meth) acrylate, trimethylolpropane tri(meth)acrylate, ethoxylated tri(meth)acrylates (for example, ethoxylated (3) trimethylolpropane tri(meth)acrylate, ethoxylated (6) trimethylolpropane tri(meth)acrylate, ethoxylated (9) trimethylolpropane tri(meth)acrylate, ethoxylated (15) trimethylolpropane tri(meth)acrylate, ethoxylated (20) trimethylolpropane tri(meth)acrylate), pentaerythritol tri(meth)acrylate, propoxylated tri(meth)acrylates (for example, propoxylated (3) glyceryl tri(meth)acrylate, propoxylated (5.5) glyceryl tri(meth)acrylate, propoxylated (3) trimethylolpropane tri(meth)acrylate, propoxylated (6) trimethylolpropane tri(meth)acrylate), trimethylolpropane tri(meth)acrylate, and tris(2-hydroxyethyl)isocyanurate tri(meth)acrylate, which is also referred to as tris(2-(meth)acryloyloxyethyl)isocyanurate.

Suitable higher functionality (meth)acrylic compounds include ditrimethylolpropane tetra(meth)acrylate, dipentaerythritol penta(meth)acrylate, ethoxylated (4) pentaerythritol tetra(meth)acrylate, pentaerythritol tetra(meth)acrylate, and caprolactone modified dipentaerythritol hexa(meth)acrylate.

Suitable oligomeric polymerizable (meth)acrylic compounds include urethane (meth)acrylates, polyester (meth)acrylates, polybutadiene (including hydrogenated polybutadiene) (meth)acrylates, and epoxy (meth)acrylates.

Suitable (meth)acrylates include (meth)acrylic acid esters of polyhydric alcohols, such as, for example, ethylene glycol, diethylene glycol, polyethylene glycol, trimethylolpropane, triethylene glycol, tetraethylene glycol, dipropylene glycol, tripropylene glycol, tetrapropylene glycol, pentapropylene glycol and polypropylene glycol; ethoxylated or propoxylated diphenylolpropane and hydroxy-terminated polyurethanes.

Suitable ethylenically unsaturated compounds include polyfunctional (meth)acrylamide monomers. As used herein the terms "(meth)acrylamide" and the plural form thereof are meant to include acrylamide and/or methacrylamide species of the designated compound.

Suitable polyfunctional (meth)acrylamides include 1,4-bis((meth)acryoyl)piperazine, bis-(meth)acrylamide (also referred to as N,N'-methylenedi(meth)acrylamide), N,N'-(1, 2-dihydroxyethylene)bis(meth)acrylamide, as well as polyfunctional (meth)acrylamides that can be formed from reaction of (meth)acrylic acid or its acid chloride with primary and/or secondary amines, such as 1,3-diaminopropane, N,N'-dimethyl-1,3-diaminopropane, 1,4-diaminobutane, polyamidoamines, and polyoxyalkylenepolyamines.

Suitable polyfunctional vinyl ethers include 1,4-cyclohexanedimethanol divinyl ether, diethylene glycol divinyl ether, triethylene glycol divinyl ether, poly(ethylene glycol) divinyl ether, and butanediol divinyl ether.

Suitable polyfunctional vinyl polydiorganosiloxanes (also referred to as vinyl silicones) include vinyl-terminated polydimethylsiloxanes, such as Gelest, Inc. DMS-V21, DMS-V22, DMS-V31, DMS-V35, and DMS-V42; and vinyl-terminated diphenylsiloxane-dimethylsiloxane copolymers, such as Gelest, Inc. PDV-0325, PDV-0331, PDV-0525, PDV-1625, PDV-1631, and PDV-1635; and polydimethylsiloxanes containing vinyl groups bonded to silicon atoms internal along the polymer chain and not at its termini, and referred to as vinylmethylsiloxane-dimethylsiloxane copolymers, trimethylsiloxy terminated, such as Gelest, Inc. VDT-131, VDT-153, VDT-431, VDT-731, and VDT-954; and polydimethylsiloxanes that contain vinyl groups both internally and at the termini, and referred to as vinylmethylsiloxane-dimethylsiloxane copolymers, vinyl terminated, such as Gelest Inc. VDV-0131.

Suitable polyfunctional vinyl aliphatics include 1,9-decadiene, and 1,2,4-trivinylcyclohexane, and polybutadiene, wherein some of the 1,3-butadiene has been incorporated by 1,2-addition.

Suitable polyfunctional allyl esters include diallyl succinate, diallyl adipate, diallyl isophthalate, diallyl phthalate, and triallyl trimellitate.

Suitable norbornenes include 2,5-norbornadiene, 5-vinyl-2-norbornene, 5-ethylidene-2-norbornene, 5-methylene-2-norbornene, dicyclopentadiene, terpolymers of ethylene, propylene, and a diene monomer, in which the diene monomer is 2,5-norbornadiene, 5-vinyl-2-norbornene, 5-ethylidene-2-norbornene, 5-methylene-2-norbornene, or dicyclopentadiene, and (bicycloheptenyl)ethyl-terminated polydimethylsiloxanes, such as Gelest, Inc. DMS-NB25 and DMS-NB32.

Suitable polyfunctional maleimides include bismaleimides, which are synthesized by the reaction of maleic anhydride and aliphatic or aromatic primary amines, such as 1,4-diaminobutane, 1,6-diaminohexane, 4,4'-methylenedianiline, 4,4'-oxydianiline, phenylenediamines, and polyamidoamines.

Various combinations of the polymerizable ethylenically unsaturated compounds may be used. Preferred combinations include miscible mixtures. It is noted that vinyl silicones and (bicycloheptenyl)ethyl-terminated polydimethylsiloxanes, however, may not be miscible with others listed herein. Further, when the ethylenically unsaturated compound is a polydiorganosiloxane, typically the thiol-containing compound is also a polydiorganosiloxane.

Thiol-Containing Compounds

Suitable polymerizable thiol-containing compounds are those compounds (e.g., monomer, oligomer, polymerizable polymer (i.e., prepolymer) that include a plurality of thiol groups (—SH groups also referred to as mercapto groups) in which the sulfur atom of the thiol group is covalently bonded to carbon (i.e., through C—S bonds). Such compounds are often referred to as "polyfunctional" thiols or polythiols.

Examples of suitable polythiols include aliphatic monomeric polythiols (ethane dithiol, hexamethylene dithiol, decamethylene dithiol, tolylene-2,4-dithiol, and the like), aromatic monomeric polythiols (benzene-1,2-dithiol, benzene-1,3-dithiol, benzene-1,4-dithiol, and the like), and some polymeric polythiols such as a thiol-terminated ethylcyclohexyl dimercaptan polymer, and the like.

Other useful polythiols are described in U.S. Pat. No. 6,605,687 (Gross et al.), and include dimercaptodiethyl sulfide, 1,6-hexanedithiol, 1,8-dimercapto-3,6-dithiaoctane, propane-1,2,3-trithiol, 1,2-bis[(2-mercaptoethyl)thio]-3-mercaptopropane, tetrakis(7-mercapto-2,5-dithiaheptyl)methane, and trithiocyanuric acid.

Preferred polythiols useful in the present disclosure include polythiols formed from the esterification of polyols with thiol-containing carboxylic acids or their derivatives. Examples of polythiols formed from the esterification of polyols with thiol-containing carboxylic acids or their derivatives include those made from the esterification reaction between thioglycolic acid or 3-mercaptopropionic acid and several polyols to form the mercaptoacetates or mercaptopropionates, respectively.

Examples of the polythiol compounds preferred because of relatively low odor level include, but are not limited to, esters of thiogylcolic acid (HS—CH$_2$COOH), α-mercaptopropionic acid (HS—CH(CH$_3$)—COOH) and β-mercaptopropionic acid, also referred to as 3-mercaptopropionic acid (HS—CH$_2$CH$_2$COOH) with polyhydroxy compounds (polyols) such as glycols, triols, tetraols, pentaols, hexaols, and the like. Specific examples of such polythiols include, but are not limited to, ethyleneglycol bis(thioglycolate), ethyleneglycol bis(β-mercaptopropionate), trimethylolpropane tris(thioglycolate), trimethylolpropane tris(β-mercaptopropionate) and ethoxylated versions, pentaerythritol tetrakis(thioglycolate), pentaerythritol tetrakis(β-mercaptopropionate), and tris(hydroxyethyl)isocyanurate tris(β-mercaptopropionate).

Suitable materials are commercially available under the trade designations THIOCURE PETMP (pentaertythritol tetra-3-mercaptopropionate), TMPMP (trimethylolpropane tri(3-mercaptopropionate), ETTMP (ethoxylated-trimethylolpropane tri-3-mercaptopropionate) such as ETTMP 1300 and ETTMP 700, GDMP glycol di(3-mercaptopropionate), TMPMA (trimethylolpropane trimercaptoacetate), TEMPIC (tris[2-(3-mercaptopropionyloxy)ethyl]), and PPGMP (propylene glycol 3-mercaptopropionate) from Bruno Bock Chemische Fabrik GmbH & Co. KG. A specific example of a polymeric polythiol is polypropylene-ether glycol bis(β-mercaptopropionate), which is prepared from polypropylene-ether glycol (e.g., PLURACOL P201, Wyandotte Chemical Corp.) and β-mercaptopropionic acid by esterification.

Other useful polythiols can be formed from the addition of hydrogen sulfide (H$_2$S) (or its equivalent) across carbon-carbon double bonds. For example, dipentene and triglycerides which have been reacted with H$_2$S (or its equivalent). Specific examples include dipentene dimercaptan and those polythiols available under the trade designations POLYMERCAPTAN 358 (mercaptanized soybean oil), and POLYMERCAPTAN 805C (mercaptanized castor oil) from Chevron Phillips Chemical Co. LLP. At least for some applications, the preferred polythiols are POLYMERCAPTAN 358 and 805C since they are produced from largely renewable materials, i.e., the triglycerides, soybean oil and castor oil, and have relatively low odor in comparison to many thiols. Useful triglycerides have at least 2 sites of unsaturation, i.e., carbon-carbon double bonds, per molecule on average, and sufficient sites are converted to result in at least 2 thiols per molecule on average. In the case of soybean oil, this requires a conversion of approximately 42 percent or greater of the carbon-carbon double bonds, and in the case of castor oil this requires a conversion of approximately 66 percent or greater of the carbon-carbon double bonds. Typically, higher conversion is preferred, and POLYMERCAPTAN 358 and 805C can be obtained with conversions greater than approximately 60 percent and 95 percent, respectively.

Other useful polythiols can be formed from the ring-opening reaction of epoxides with H$_2$S (or its equivalent). Preferred polythiols of this type include those available under the trade designations POLYMERCAPTAN 407 (mercaptohydroxy soybean oil) from Chevron Phillips Chemical Co. LLP, and CAPCURE, specifically CAPCURE 3-800 (a polyoxyalkylene triol with mercapto end groups of the structure R[O(C$_3$H$_6$O)$_n$—CH$_2$—CH(OH)—CH$_2$SH]3 wherein R represents an aliphatic hydrocarbon group having 1-12 carbon atoms and n is an integer from 1 to 25), formerly from BASF, Inc. (and now Gabriel Performance Products, Ashtabula, Ohio).

Other useful polythiols of this type include those derived from the reaction of H$_2$S (or its equivalent) with the glycidyl ethers of bisphenol A epoxy resins, bisphenol F epoxy resins, and novolak epoxy resins. A preferred polythiol of this type is QX11, derived from bisphenol A epoxy resin, from Japan Epoxy Resins (JER) under the trade desingation EPOMATE. Other polythiols suitable include those available under the trade designations EPOMATE QX10 and QX20 from JER.

Other useful polythiols are polysulfides that contain thiol groups such as those available under the trade designations THIOKOL LP-2, LP-3, LP-12, LP-31, LP-32, LP-33, LP-977, and LP-980 from Toray Fine Chemicals Co., Ltd.

Another type of polythiol, thiol-containing silicones is preferred when the ethylenically unsaturated compound is a polydiorganosiloxane. Polydimethylsiloxanes in which some of the methyl groups have been replaced by mercaptoalkyl groups are preferred. Specific examples include those available under the trade designations SMS-022 and SMS-042 (from Gelest Inc.), as well as KF-2001 and KF-2004 (from Shin-Etsu Chemical Co. Ltd. (Tokyo, Japan)), in which some silicon atoms internal to the polymer chain, i.e., not at the termini, are substituted with mercaptoalkyl groups. Another preferred silicone is Shin-Etsu Chemical Co. Ltd. X-22-167B, in which both terminal silicon atoms are substituted with mercaptoalkyl groups.

Various combinations of the polymerizable thiol-containing compounds may be used. Preferred combinations include miscible mixtures. It is noted that thiol-containing silicones, however, may not be miscible with other thiol containing compounds listed herein.

It is noted that thiol-containing silicones (i.e., polydiorganosiloxanes) may not be suitable for combination (or mixture) with many of the ethylenically unsaturated compounds due to their lack of miscibility with these compounds and their high price. However, in the case where the ethylenically unsaturated compound is also a silicone (i.e., polydiorganosiloxane), the thiol-containing polydiorganosiloxanes are preferred due to their miscibility with these ethylenically unsaturated polydiorganosiloxanes and the lack of miscibility of the non-silicone polythiols with these silicones that contain the ethylenically unsaturated groups.

Exemplary thiol-containing compounds include those prepared from esterification of polyols with thiol-containing carboxylic acids or their derivatives, those prepared from a ring-opening reaction of epoxides with H$_2$S (or its equivalent), those prepared from the addition of H$_2$S (or its equivalent) across carbon-carbon double bonds, polysulfides, and polydiorganosiloxanes. Specifically, these include the 3-mercaptopropionates (also referred to as β-mercaptopropionates) of ethylene glycol and trimethylolpropane (the former from Evans Chemetrics, now part of Bruno Boch, the latter from Sigma-Aldrich); POLYMERCAPTAN 805C (mercaptanized castor oil); CAPCURE 3-800 (a polyoxyalkylene triol with mercapto end groups of the structure R[O(C$_3$H$_6$O)$_n$—CH$_2$—CH(OH)—CH$_2$SH]3 wherein R represents an aliphatic hydrocarbon group having 1-12 carbon atoms and n is an integer from 1 to 25); THIOKOL LP-3 polysulfide; and GELEST SMS-022 and SMS-042 (polydimethylsiloxanes in which some of the methyl groups have been replaced by mercaptoalkyl groups).

In certain embodiments, the wt.-% of the thiol-containing compound is at least 1 wt.-%, or at least 10 wt.-%, or at least 20 wt.-%, or at least 30 wt.-%, or at least 40 wt.-% of the total weight of the thiol-containing and ethylenically unsaturated compounds. In certain embodiments, the wt.-% of the thiol-containing compound is up to 99 wt.-%, or up to 90 wt.-%, or up to 80 wt.-%, or up to 70 wt.-%, or up to 60 wt.-% of the total weight of the thiol-containing and ethylenically unsaturated compounds. In certain embodiments, the wt.-% of the ethylenically unsaturated compound is at least 1 wt.-%, or at least 10 wt.-%, or at least 20 wt.-%, or at least 30 wt.-%, or at least 40 wt.-% of the total weight of the thiol-containing and ethylenically unsaturated compounds. In certain embodiments, the wt.-% of the ethylenically unsaturated compound is up to 99 wt.-%, or up to 90 wt.-%, or up to 80 wt.-%, or up to 70 wt.-%, or up to 60 wt.-% of the total weight of the thiol-containing and ethylenically unsaturated compounds.

In certain embodiments, the amount of the thiol groups from the thiol-containing compounds and the amount of ethylenically unsaturated groups from the ethylenically unsaturated compounds are present in a molar ratio range of 0.25:1.0 to 4.0:1.0, or 0.33:1.0 to 3.0:1.0, or 0.5:1.0 to 2.0:1.0, or 0.75:1.0 to 1.33:1.0, or 0.80:1.0 to 1.25:1.0 (thiol groups:ethylenically unsaturated groups). In some specific embodiments, the molar ratio is preferably 0.5:1.0 to 2.0:1.0. In certain embodiments, for example where crosslinking of high molecular weight polymers that contain an ethylenically unsaturated repeating unit, such as 1,2-polybutadiene or unsaturated polyesters, is desired, the amount of thiol groups and the amount of ethylenically unsaturated groups may be present in a molar range of 0.005:1.0 to 0.20:1.0 (thiol groups:ethylenically unsaturated groups).

Optional Additives

The multi-part compositions can include other optional additives. These optional additives can be in Part A, Part B, or in any other part. Peroxygen compounds may be particularly useful additive for decreasing the cure time in applications that require relatively thick coating, for example, such as those having a coating thickness greater than 0.25 mm, or greater than 0.50 mm, or greater than 1.00 mm. Particularly useful peroxygen compounds are peroxides that have half lifes of 10 hours at temperatures of approximately 90° C. or greater, such as 1,1-di(tert-butylperoxy)cyclohexane, tert-amylperoxy 2-ethylhexy carbonate, tert-amyl peroxyacetate, 2,2-di(tert-butylperoxy)butane, tert-butylperoxy isopropyl carbonate, dicumyl peroxide, tert-butyl peroxy-3,5,5-trimethylhexanoate, 2,5-dimethyl-2,5-di(tert-butylperoxy)hexane, di-tert-butyl peroxide, 2,5-dimethyl-2,5-di(tert-butylperoxy)hexyne-3, and tert-butyl cumyl peroxide.

Another particularly useful additive is a thickener, such as medium (e.g., 40,000 grams/mole) molecular weight polybutyl methacrylate that may generally be incorporated in an amount of up to 50 percent by weight, based on the total weight of the polymerizable monomers. Thickeners may be employed to increase the viscosity of the resulting composition to a more easily applied viscous syrup-like consistency.

Yet another particularly useful additive is an elastomeric material. These materials can improve the fracture toughness of compositions made therewith, which can be beneficial when, for example, bonding stiff, high yield strength materials (e.g., metal substrates that do not mechanically absorb energy as easily as other materials, such as flexible polymeric substrates). Such additives can generally be incorporated in an amount of up to 50 percent by weight, based on the total weight of the composition.

Core-shell polymers can also be added to modify spreading and flow properties of the composition. These enhanced properties may be manifested by a reduced tendency for the composition to leave an undesirable "string" upon dispensing from a syringe-type applicator, or sag or slump after having been applied to a vertical surface. Accordingly, use of more than 20 percent by weight, based on total weight of the composition, of a core-shell polymer additive may be desirable for achieving improved sag-slump resistance. Core-shell polymers can also improve the fracture toughness of compositions made therewith, which can be beneficial when, for example, bonding stiff, high yield strength materials (e.g., metal substrates that do not mechanically absorb energy as easily as other materials, such as flexible polymeric substrates).

Small amounts of inhibitors, such as hydroquinone monomethyl ether, 2,6-di-(tert-butyl-1,2-dihydroxy benzene, 2,6-di-(tert-butyl)-4-methyl-phenol, pyrogallic acid, and tris (N-nitroso-N-phenylhydroxylamine) aluminum salt may be used in polymerizable compositions, for example, to prevent reaction or reduce degradation of the polymerizable monomers during storage. Inhibitors may be added in an amount that does not materially affect the rate of curing or the ultimate properties of polymers made therewith. Accordingly, inhibitors are generally useful in amounts of 100-30,000 parts per million (ppm) based on the total weight of polymerizable monomers in a polymerizable composition.

Other possible additives include UV absorbers and light stabilizers, flame retardents, plasticizers, adhesion promoters, non-reactive diluents, non-reactive colorants, tackifiers, fillers (e.g., carbon black, hollow glass/ceramic beads, silica, titanium dioxide, calcium carbonate, solid glass/ceramic spheres, electrically and/or thermally conductive particulate, such as metal particles, graphite, alumina trihydrate (also referred to as aluminum hydroxide), alumina, boron nitride, and silicon carbide, glass/ceramic fiber, carbon fiber, antistatic compounds, and chalk), and the like. The various optional additives are employed in any amount, but generally amounts that do not significantly adversely affect the curing process or the desired properties of polymers made therewith.

Combinations

Multi-part compositions according to the present disclosure are provided as at least a part A and a part B, with these parts being mixed prior to use of the composition (e.g., application of the composition to a substrate). In this way, activation of the organoborane can be delayed until parts A and B are combined.

More specifically, compositions of the present disclosure are multi-part polymerizable compositions that include at least two parts: a part A composition that includes an organoborane-base complex; and a part B composition that includes a decomplexing agent. These two parts are kept separate until reaction is desired. The polymerizable components can be in part A, part B, or another part distinct from parts A and B. The polymerizable ethylenically unsaturated component and the thiol-containing component can be separate or together in part A, part B, or another part distinct from parts A and B. Various combinations can be envisioned.

For a two-part composition in which part A includes an organoborane-base complex and part B includes a decomplexing agent, the following combinations of the polymerizable ethylenically unsaturated component and the thiol-containing component can be created:

(1) the polymerizable thiol-containing and ethylenically unsaturated components are only in Part A;
(2) the polymerizable thiol-containing and ethylenically unsaturated components are only in Part B;
(3) all of the polymerizable thiol-containing component is in Part A and all of the polymerizable ethylenically unsaturated component is in Part B;
(4) all of the polymerizable ethylenically unsaturated component is in Part A and all of the polymerizable thiol-containing component is in Part B;

(5) each of Part A and Part B include a portion of the polymerizable thiol-containing component and a portion of the polymerizable ethylenically unsaturated component;
(6) Part A includes a portion of the polymerizable thiol-containing component and all of the polymerizable ethylenically unsaturated component, and Part B includes a portion of the polymerizable thiol-containing component;
(7) Part A includes all of the polymerizable thiol-containing component and a portion of the polymerizable ethylenically unsaturated component, and Part B includes a portion of the polymerizable ethylenically unsaturated component;
(8) Part A includes a portion of the polymerizable thiol-containing component, and Part B includes a portion of the polymerizable thiol-containing component and all of the polymerizable ethylenically unsaturated component; and
(9) Part A includes a portion of the polymerizable ethylenically unsaturated component, and Part B includes a portion of the polymerizable ethylenically unsaturated component and all of the polymerizable thiol-containing component.

In certain situations compatibility between the organoborane-base complex or the decomplexing agent and the polymerizable components as it relates to the stability of the components needs to be considered when determining the various combinations. In addition, compatibility of the polymerizable components (i.e., the polyfunctional thiol-containing compounds and the polyfunctional ethylenically unsaturated compounds) needs to be considered.

Two-part compostions are preferred due to cost considerations, as is long shelf life.

When a two part composition is used, in addition to separating the organoborane-base complex from the decomplexing agent, stability of the combinations with the other components should be considered. For example, preferred stable combinations include: an organoborane-base complex with a vinyl ether, vinyl aliphatic, allyl ether, or allyl amide; and a polythiol with a decomplexing agent selected from a carboxylic acid, acid anhydride, 1,3-dicarbonyl, isocyanate, aldehyde, or phosphonic acid. More preferred combinations include: an organoborane-base complex with a vinyl ether, vinyl aliphatic, allyl ether, or allyl amide; and a polythiol with a decomplexing agent selected from a carboxylic acid, acid anhydride, 1,3-dicarbonyl, or phosphonic acid. For longer shelf life, an organoborane-base complex is preferably not in the same part with an acrylate, methacrylate, acrylamide, methacrylamide, or allyl ester.

Methods

For multi-part compositions such as those described in the present disclosure to be most easily used in commercial and industrial environments, the ratio at which the various parts are combined should be a convenient whole number. This facilitates application of the composition with conventional, commercially available dispensers. Such dispensers are shown in U.S. Pat. No. 4,538,920 (Drake) and U.S. Pat. No. 5,082,147 (Jacobs) and are available from ConProTec, Inc. (Salem, N.H.) under the trade designation MIXPAC, and are sometimes described as dual syringe-type applicators.

Typically, for two-part compositions, such dispensers use a pair of tubular receptacles arranged side-by-side with each tube being intended to receive one of the two parts of the composition. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two parts. The blended composition is extruded from the mixing chamber, typically onto a substrate. Once the tubes have been emptied, they can be replaced with fresh tubes and the application process continued.

The ratio at which the parts of the composition are combined is controlled by the diameter of the tubes. Each plunger is sized to be received within a tube of fixed diameter, and the plungers are advanced into the tubes at the same speed. A single dispenser is often intended for use with a variety of different compositions and the plungers are sized to deliver the parts of the composition at a convenient mix ratio. For two-part compositions, some common mix ratios are 1:1, 1:2, 1:4, and 1:10 volume:volume.

If the parts of the composition are combined in an odd mix ratio (e.g., 3.5:100), then the ultimate user would probably manually weigh the parts of the composition. Thus, for best commercial and industrial utility and for ease of use with currently available dispensing equipment, the parts, particularly two parts, of the composition should be capable of being combined in a common whole number mix ratio such as, for example, 1:1, 1:2, 1:4, and 1:10.

Once the parts have been combined, the composition should preferably be used within a period of time less than or equal to the work-life of the composition. Once the parts are combined, e.g., part A and part B, the reaction occurs under mild conditions, and preferably under ambient conditions. In this context, "mild conditions" include 0° C. to 50° C., 10° C. to 50° C., 19° C. to 50° C., or 19° C. to 40° C., or 19° C. to 30° C., or 19° C. to 25° C. Ambient conditions include room temperature. If desired, heat could be applied to accelerate the reaction.

Once the parts are combined, e.g., part A and part B, the reaction occurs within hours. For example, the time for curing the composition can typically range from seconds to 12 hours under ambient conditions. Post-curing at an elevated temperature may also be used if desired. Although relatively quick reaction (polymerization and/or crosslinking) can occur within 12 hours, certain embodiments do not cure that quickly. Such compositions are useful in situations that do not require such rapid cure.

Illustrative Embodiments of the Present Disclosure

Embodiment 1 is a polymerizable composition comprising:
    an organoborane-base complex, wherein the base is a complexing agent selected from a compound having one or more amine groups, amidine groups, hydroxide groups, alkoxide groups, or a combination thereof;
    a decomplexing agent that liberates the organoborane from the organoborane-base complex;
    a polymerizable thiol-containing component comprising at least one polymerizable thiol-containing compound having a plurality of thiol groups in which the sulfur atom of the thiol group is covalently bonded to carbon; and
    a polymerizable ethylenically unsaturated component comprising at least one polymerizable ethylenically unsaturated compound having a plurality of ethylenically unsaturated groups;
    wherein the total amount of the thiol-containing and ethylenically unsaturated compounds total at least 50% by weight of all polymerizable material in the composition.

Embodiment 2 is the polymerizable composition of embodiment 1 wherein upon reaction a —C—S—C—C— linkage is formed.

Embodiment 3 is the polymerizable composition of embodiment 1 or 2 wherein the thiol-containing compound and the ethylenically unsaturated compound are separate and distinct compounds.

Embodiment 4 is the polymerizable composition of any of embodiments 1 through 3 wherein the organoborane-base complex does not include a thiol group.

Embodiment 5 is the polymerizable composition of any of embodiments 1 through 4 wherein the organoborane portion of the organoborane-base complex is of the formula $B(R^1)(R^2)(R^3)$ wherein:
  $R^1$ represents an alkyl group having from 1 to 10 carbon atoms; and
  $R^2$ and $R^3$ independently represent:
    alkyl groups having 1 to 10 carbon atoms;
    cycloalkyl groups having 3 to 10 carbon atoms;
    aryl groups having 6 to 12 carbon atoms; or aryl groups substituted with alkyl groups having 1 to 10 carbon atoms or cycloalkyl groups having 3 to 10 carbon atoms;
    provided that any two of $R^1$, $R^2$, and $R^3$ groups may optionally be part of a ring.

Embodiment 6 is the polymerizable composition of embodiment 5 wherein the organoborane-base complex is represented by the following Formula II:

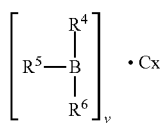

wherein:
  $R^4$ represents an alkyl group having from 1 to 10 carbon atoms; and
  $R^5$ and $R^6$ independently represent:
    alkyl groups having 1 to 10 carbon atoms;
    cycloalkyl groups having 3 to 10 carbon atoms;
    aryl groups having 6 to 12 carbon atoms; or
    aryl groups substituted with alkyl groups having 1 to 10 carbon atoms or cycloalkyl groups having 3 to 10 carbon atoms;
    provided that any two of $R^4$, $R^5$, and $R^6$ groups may optionally be part of a ring
  Cx represents a complexing agent selected from a compound having one or more amine groups, amidine groups, hydroxide groups, alkoxide groups, or a combination thereof; and
  v is a positive number.

Embodiment 7 is the composition of embodiment 6 wherein:
  $R^4$ represents an alkyl group having from 1 to 10 carbon atoms;
  $R^5$ and $R^6$ independently represent alkyl groups having 1 to 10 carbon atoms or awl groups having 6 to 12 carbon atoms;
  Cx represents a complexing agent selected from a compound having one or more amine groups, amidine groups, hydroxide groups, alkoxide groups, or a combination thereof; and
  v is in a range of 0.1 to 4.

Embodiment 8 is the polymerizable composition of embodiment 6 or 7 wherein Cx is an amine comprising a primary or secondary amine group.

Embodiment 9 is the polymerizable composition of embodiment 6 or 7 wherein Cx is a polyamine comprising at least one primary or secondary amine group.

Embodiment 10 is the polymerizable composition of any of embodiments 1 through 9 wherein the decomplexing agent comprises at least one of a carboxylic acid, an acid anhydride, an aldehyde, an isocyanate, a phosphonic acid, or a 1,3-dicarbonyl.

Embodiment 11 is the polymerizable composition of any of embodiments 1 through 10 which is a multi-part polymerizable composition.

Embodiment 12 is the polymerizable composition of embodiment 11 wherein the multi-part polymerizable composition comprises:
  a part A composition comprising the organoborane-base complex; and
  a part B composition comprising the decomplexing agent;
  wherein the polymerizable thiol-containing component is in part A, part B, or another part distinct from parts A and B; and
  wherein the polymerizable ethylenically unsaturated component is in part A, part B, or another part distinct from parts A and B.

Embodiment 13 is the polymerizable composition of embodiment 12 wherein part B is free of the organoborane-base complex and wherein part A is free of the decomplexing agent.

Embodiment 14 is the polymerizable composition of embodiment 12 or 13 wherein the multi-part polymerizable composition is a two-part composition.

Embodiment 15 is the polymerizable composition of embodiment 14 wherein the polymerizable thiol-containing and ethylenically unsaturated components are only in Part A.

Embodiment 16 is the polymerizable composition of embodiment 14 wherein the polymerizable thiol-containing and ethylenically unsaturated components are only in Part B.

Embodiment 17 is the polymerizable composition of embodiment 14 wherein all of the polymerizable thiol-containing component is in Part A and all of the polymerizable ethylenically unsaturated component is in Part B.

Embodiment 18 is the polymerizable composition of embodiment 14 wherein all of the polymerizable ethylenically unsaturated component is in Part A and all of the polymerizable thiol-containing component is in Part B.

Embodiment 19 is the polymerizable composition of embodiment 14 wherein each of Part A and Part B include a portion of the polymerizable thiol-containing component and a portion of the polymerizable ethylenically unsaturated component.

Embodiment 20 is the polymerizable composition of embodiment 14 wherein Part A includes a portion of the polymerizable thiol-containing component and all of the polymerizable ethylenically unsaturated component, and Part B includes a portion of the polymerizable thiol-containing component.

Embodiment 21 is the polymerizable composition of embodiment 14 wherein Part A includes all of the polymerizable thiol-containing component and a portion of the polymerizable ethylenically unsaturated component, and Part B includes a portion of the polymerizable ethylenically unsaturated component.

Embodiment 22 is the polymerizable composition of embodiment 14 wherein Part A includes a portion of the polymerizable thiol-containing component, and Part B includes a portion of the polymerizable thiol-containing component and all of the polymerizable ethylenically unsaturated component.

Embodiment 23 is the polymerizable composition of embodiment 14 wherein Part A includes a portion of the polymerizable ethylenically unsaturated component, and Part B includes a portion of the polymerizable ethylenically unsaturated component and all of the polymerizable thiol-containing component.

Embodiment 24 is the polymerizable composition of any of embodiments 1 through 23 wherein the thiol-containing component comprises at least one polymerizable thiol-containing compound selected from those prepared from a ring-opening reaction of epoxides with $H_2S$ (or its equivalent), those prepared from the addition of $H_2S$ (or its equivalent) across carbon-carbon double bonds, polysulfides, polydimethylsiloxanes in which some of the methyl groups have been replaced by mercaptoalkyl groups, and those prepared from the esterification of polyols with thiol-containing carboxylic acids or their derivatives.

Embodiment 25 is the polymerizable composition of any of embodiments 1 through 24 wherein the ethylenically unsaturated compound is selected from polyfunctional vinyl ethers, vinyl silicones, vinyl aliphatics, (meth)acrylates, allyl ethers, allyl esters, and allyl amides.

Embodiment 26 is the polymerizable composition of any of embodiments 1 through 25 wherein the amount of the thiol groups in the polymerizable thiol-containing component and the amount of ethylenically unsaturated groups in the polymerizable ethylenically unsaturated component are in a molar ratio range of 0.25:1.0 to 4.0:1.0.

Embodiment 27 is the polymerizable composition of embodiment 12 or 18 wherein the organoborane-base complex is combined in Part A with a vinyl ether, vinyl aliphatic, allyl ether, or allyl amide; and a thiol-containing compound is combined in Part B with a decomplexing agent selected from carboxylic acid, acid anhydride, 1,3-dicarbonyl, isocyanate, aldehyde, and phosphonic acid.

Embodiment 28 is a polymerizable composition comprising:
a part A composition comprising an organoborane-base complex, wherein the base is a complexing agent selected from a compound having one or more amine groups, amidine groups, hydroxide groups, alkoxide groups, or a combination thereof;
a part B composition comprising a decomplexing agent that liberates the organoborane from the organoborane-base complex;
wherein the polymerizable composition further comprises:
a polymerizable thiol-containing component comprising at least one polymerizable thiol-containing compound having a plurality of thiol groups in which the sulfur atom of the thiol group is covalently bonded to carbon; and
a polymerizable ethylenically unsaturated component comprising at least one polymerizable ethylenically unsaturated compound having a plurality of ethylenically unsaturated groups;
wherein the total amount of the thiol-containing and ethylenically unsaturated compounds total at least 50% by weight of all polymerizable material in the composition.

Embodiment 29 is the polymerizable composition of embodiment 28 wherein upon reaction a —C—S—C—C— linkage is formed.

Embodiment 30 is the polymerizable composition of embodiment 28 or 29 wherein the organoborane-base complex is represented by the formula:

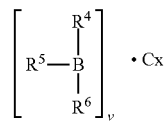

wherein:
$R^4$ represents an alkyl group having from 1 to 10 carbon atoms;
$R^5$ and $R^6$ independently represent alkyl groups having 1 to 10 carbon atoms or aryl groups having 6 to 12 carbon atoms;
Cx represents a complexing agent selected from a compound having one or more amine groups, amidine groups, hydroxide groups, alkoxide groups, or a combination thereof; and
v is in a range of 0.1 to 4.

Embodiment 31 is the polymerizable composition of embodiment 30 wherein Cx is an amine comprising at least one primary or secondary amine group.

Embodiment 32 is the polymerizable composition of any of embodiments 28 through 31 wherein the amount of the thiol groups in the polymerizable thiol-containing component and the amount of ethylenically unsaturated groups in the polymerizable ethylenically unsaturated component are in a molar ratio range of 0.25:1.0 to 4.0:1.0.

Embodiment 33 is a composition prepared by combining components comprising:
a part A composition comprising an organoborane-base complex, wherein the base is a complexing agent selected from a compound having one or more amine groups, amidine groups, hydroxide groups, alkoxide groups, or a combination thereof; and
a part B composition comprising a decomplexing agent that liberates the organoborane from the organoborane-base complex;
wherein the part A composition and/or the part B composition further comprises:
a polymerizable thiol-containing component comprising at least one polymerizable thiol-containing compound having a plurality of thiol groups in which the sulfur atom of the thiol group is covalently bonded to carbon; and
a polymerizable ethylenically unsaturated component comprising at least one polymerizable ethylenically unsaturated compound having a plurality of ethylenically unsaturated groups;
wherein the total amount of the thiol-containing and ethylenically unsaturated compounds total at least 50% by weight of all polymerizable material in the composition.

Embodiment 34 is the composition of claim 33 wherein upon reaction a —C—S—C—C— linkage is formed.

Embodiment 35 is the composition of embodiment 33 or 34 wherein the organoborane-base complex is represented by the formula:

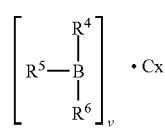

wherein:
R[4] represents an alkyl group having from 1 to 10 carbon atoms;
R[5] and R[6] independently represent alkyl groups having 1 to 10 carbon atoms or aryl groups having 6 to 12 carbon atoms;
Cx represents a complexing agent selected from a compound having one or more amine groups, amidine groups, hydroxide groups, alkoxide groups, or a combination thereof; and
v is in a range of 0.1 to 4.

Embodiment 36 is the composition of embodiment 35 wherein Cx is an amine comprising at least one primary or secondary amine group.

Embodiment 37 is the composition of any of embodiments 30 through 33 wherein the amount of the thiol groups in the polymerizable thiol-containing component and the amount of ethylenically unsaturated groups in the polymerizable ethylenically unsaturated component are in a molar ratio range of 0.25:1.0 to 4.0:1.0.

Embodiment 38 is a method of making a composition, the method comprising:
combining components comprising:
a part A composition comprising an organoborane-base complex, wherein the base is a complexing agent selected from a compound having one or more amine groups, amidine groups, hydroxide groups, alkoxide groups, or a combination thereof; and
a part B composition comprising a decomplexing agent that liberates the organoborane from the organoborane-base complex;
wherein the part A composition and/or the part B composition further comprises:
a polymerizable thiol-containing component comprising at least one polymerizable thiol-containing compound having a plurality of thiol groups in which the sulfur atom of the thiol group is covalently bonded to carbon; and
a polymerizable ethylenically unsaturated component comprising at least one polymerizable ethylenically unsaturated compound having a plurality of ethylenically unsaturated groups;
wherein the total amount of the thiol-containing and ethylenically unsaturated compounds total at least 50% by weight of all polymerizable material in the composition; and allowing the part A and the part B to react to form a polymer.

Embodiment 39 is the method of embodiment 38 wherein the polymer includes a —C—S—C—C— linkage.

Embodiment 40 is the method of embodiment 38 or 39 wherein the organoborane-base complex is represented by the formula:

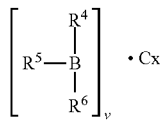

wherein:
R[4] represents an alkyl group having from 1 to 10 carbon atoms;
R[5] and R[6] independently represent alkyl groups having 1 to 10 carbon atoms or aryl groups having 6 to 12 carbon atoms;
Cx represents a complexing agent selected from a compound having one or more amine groups, amidine groups, hydroxide groups, alkoxide groups, or a combination thereof; and
v is in a range of 0.1 to 4.

Embodiment 41 is the method of embodiment 40 wherein Cx is an amine comprising at least one primary or secondary amine group.

Embodiment 42 is the method of any of embodiments 38 through 41 wherein the amount of the thiol groups and the amount of ethylenically unsaturated groups are in a molar ratio range of 0.25:1.0 to 4.0:1.0.

Embodiment 43 is the method of any of embodiments 38 through 41 wherein allowing the part A and the part B to react occurs at room temperature.

Embodiment 44 is the polymerized product of any one of embodiments 1 to 32.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Test Methods
Determination of Vinyl Equivalent Weights for Vinyl-Terminated Polydimethylsiloxanes by Titration:

The vinyl content was determined by the Wijs Method (see Snell and Biffen, *Commercial Methods of Analysis*, McGraw-Hill, 1944, p. 345). The carbon double bonds were reacted with iodine monochloride (in excess) and subsequently, the excess iodine monochloride was reacted with potassium iodide to form iodine ($I_2$), which was titrated with sodium thiosulfate. The general reaction sequence is thought to be as shown below:

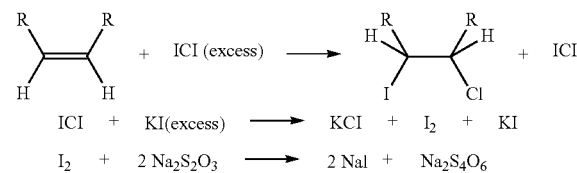

where one R in the above reaction sequence represented hydrogen and the other R represented the polydimethylsiloxane chain for the vinyl-functional polydimethylsiloxanes. The vinyl-functional polydimethylsiloxane was weighed into a 125 milliliters (mL) iodine flask, the sample containing up to but not exceeding 1.6 millimoles (mmol) of unsaturation. Supplier information on vinyl content was used initially to determine appropriate sample weight. If the titration indicated that the sample weight did not fall within specification (i.e., unsaturation not to exceed 1.6 mmol), the sample weight was adjusted and the titration repeated. Chloroform (25 mL) was added to the flask and the sample dissolved. Wijs solution (15 mL, 0.1 normal (N) iodine monochloride in glacial acetic acid) was added to the flask by pipet, the flask was then stoppered, and then was swirled vigorously. The sample stood in the dark for 30 minutes (min) with occasional swirling (approximately every 10 min). At the end of the 30 min reaction time, approximately 1 gram (g) solid KI (granular) was added to the funnel top of the flask, the stopper released slightly, and the KI rinsed into the flask with approximately 15 mL of distilled, deionized water and swirled for 1-2 min. Then 50 mL of distilled, deionized water was added to the flask, and the contents were slowly potentiometrically titrated with 0.1 N aqueous Na$_2$S$_2$O$_3$, using a METROHM 751 TITRINO autotitrator with platinum/pH combination electrode. A set of three blanks was also titrated in the same manner (i.e., no vinyl-functional polydimethylsiloxane sample was placed in the iodine flask, but the rest of the procedure was the same as above).

The Vinyl Equivalent Weight was calculated using the following equation:

$$\text{Vinyl Equivalent Weight} = \frac{(SW_{grams}) * (1000) * (2)}{(V_b - V_s) * (N)}$$

where: $V_s$ is the volume of aqueous Na$_2$S$_2$O$_3$ solution used to titrate sample, in mL
$V_b$ is the volume of aqueous Na$_2$S$_2$O$_3$ solution used to titrate blank, in mL
N is the normality of aqueous Na$_2$S$_2$O$_3$ titrant, in moles/L
$SW_{grams}$=sample weight in grams Two samples of the same vinyl-functional polydimethylsiloxane were titrated in this way, and the two values of the vinyl equivalent weight as determined from the two titrations were averaged to give a "Vinyl Equivalent Weight."
Determination of Thiol Equivalent Weights for (Mercaptopropyl)Methylsiloxane-Dimethylsiloxane Copolymers by Titration:

The method used to determine thiol content was based upon the coordination/precipitation of silver ion by mercaptans (thiols). This methodology was adapted from that of J. H. Karchmer as cited in S. Siggia, *Quantitative Organic Analysis via Functional Groups*, Wiley & Sons, 1963, pp. 582-586.

The (mercaptopropyl)methylsiloxane-dimethylsiloxane copolymer (0.5 milliequivalents (meq) to 1.5 meq) was weighed into the titration flask, and 60 mL tetrahydrofuran was added, and the sample dissolved. Supplier information on thiol content was used initially to determine appropriate sample weight. If the titration indicated that the sample weight did not fall within specification (i.e., 0.5 meq to 1.5 meq), the sample weight was adjusted and the titration repeated. Next, 2 mL of glacial acetic acid was added to the flask via a volumetric pipette that had been rinsed with deionized (18MΩ) water and then rinsed with glacial acetic acid for the transfer. The content of the flask was titrated with approximately 0.005 N silver acetate in tetrahydrofuran using a silver-glass pH combination electrode (METROHM 6.0430.100 'SILVER TITRODE'). A set of three blanks was also titrated in the same manner (i.e., 60 mL of tetrahydrofuran was added to a titration flask without any sample, followed by 2 mL glacial acetic acid, and then the contents titrated with approximately 0.005 N silver acetate in tetrahydrofuran). Titration of the blanks agreed to within 0.01 mL of titrant.

The Thiol Equivalent Weight was calculated using the following equation:

$$\text{Thiol Equivalent Weight} = \frac{(SW_{grams}) * (1000)}{(V_s - V_b) * N}$$

where: $SW_{grams}$=sample weight in grams
$V_s$ is the Volume titrant used to titrate sample, in mL
$V_b$ is the Volume titrant used to titrate blank, in mL
N is the Normality of Titrant, in moles/L Three samples of the same (mercaptopropyl)methylsiloxane-dimethylsiloxane copolymer were titrated in this way, and the three values of the thiol equivalent weight as determined from the three titrations were averaged to give a "Thiol Equivalent Weight."
Determination of Vinyl Equivalent Weights for Vinyl-Functional Polydimethylsiloxanes by NMR Spectroscopy:

Three drops of the vinyl functional polydimethylsiloxane (PDMS) polymer was mixed with approximately 500 microliters (IL) of deuterated tetrahydrofuran (d-THF) in a two dram vial. When the PDMS was completely dissolved in the d-THF, the resulting solution was transferred to a Wilmad economy grade 5 mm borosilicate glass NMR tube. The NMR tube was placed in a spinner and pneumatically inserted into a Bruker 500 MHz AVANCE NMR spectrometer equipped with a cryogenically cooled broad-band NMR probe head. After locking and shimming operations were completed using the deuterium of the d-THF, one dimensional (1D) proton NMR data were collected using a 15 degree (15°) pulse width. One hundred twenty eight (128) transients of 32 k points were collected using a approximately 4 second acquisition time and no recycle delay. The data were Fourier Transformed (FT) without apodization, linear prediction, or zero filling.

Neglecting the residual proto-solvent resonances, the resulting spectrum showed three doublets of doublets assignable to the vinyl moieties ($^1$H NMR (500 MHz, THF) δ ppm 5.77 (dd, J=20.54, 4.16 Hz, 1H, vinyl a), 5.94 (dd, J=14.79, 4.03 Hz, 1H, b), 6.15 (dd, J=20.30, 14.92 Hz, 1H, c)), i.e., consistent with the following structure:

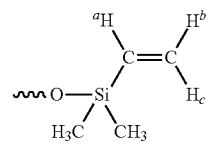

and large multiplet at 0.12 parts per million (ppm) assignable to the PDMS methyl resonances. The data were electronically integrated and the integral scale was chosen such that each of the vinyl protons had an integral of approximately 2 units. After setting this scale, the integral value of the PDMS resonance centered at 0.12 ppm was adjusted by subtraction of 12 units corresponding to the 12 protons of the four methyl groups bonded to the two silicon atoms attached to the two terminal vinyl end groups. The number of siloxane repeat units —(CH$_3$)$_2$SiO— associated with 2 terminal vinyl end groups was then determined by dividing the adjusted integral value of the PDMS resonance by 6. The vinyl equivalent weight was determined by multiplying this value by the molecular weight of a siloxane repeat unit (74.15) and adding the molecular weight of both vinyl end groups, which was 85.20 for CH$_2$CHSi(CH$_3$)$_2$— and 101.20 for CH$_2$CHSi(CH$_3$)$_2$O—, and then dividing the total weight by 2.
Determination of Thiol Equivalent Weights for (Mercaptopropyl)Methylsiloxane-Dimethylsiloxane Copolymers by NMR Spectroscopy:

Three drops of the (mercaptopropyl)methylsiloxane-dimethylsiloxane were mixed with approximately 500 microliters of deuterated tetrahydrofuran (d-THF) in a two dram vial. When the PDMS copolymer was completely dissolved in the d-THF, the resulting solution was transferred to a Wilmad economy grade 5 millimeters (mm) borosilicate glass NMR tube. The NMR tube was placed in a spinner and pneumatically inserted into a Varian 600 MHz Inova NMR spectrometer equipped with an inverse NMR probe head. After locking and shimming operations were completed using the deuterium of the d-THF, one dimensional (1D) proton NMR data were collected using a 15° pulse width. One hundred twenty eight (128) transients of 32 k points were collected using a 3 second acquisition time and no recycle delay. The data were Fourier Transformed (FT) without apodization, linear prediction, or zero filling.

Neglecting the residual proto-solvent resonances, the resulting spectrum showed seven multiplets assignable to the 3-mercaptopropyl moieties ($^1$H NMR (600 MHz, THF) δ ppm 2.49 (quartet, 2H, c), 1.67 (multiplet, 2H, b), 1.51 (triplet, 1H, d), 0.66 (multiplet, 2H, a)), consistent with the following structure:

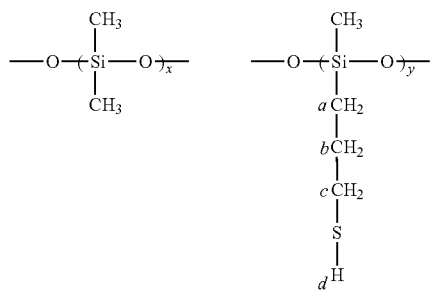

and large multiplet at 0.10 ppm assignable to the methyl resonances of the siloxane copolymer. The data were electronically integrated and the integral scale was chosen such that each of the 3-mercaptopropyl proton resonances had an integral of approximately 2 units and the thiol proton had an integral of approximately 1 unit. After setting this scale, the integral value of the methyl resonances centered at 0.10 ppm was adjusted by subtraction of 3 units corresponding to the 3 protons of the methyl group bonded to the silicon atom attached to the 3-mercaptopropyl moiety. The number of dimethylsiloxane repeat units —(CH$_3$)$_2$SiO— was then determined by dividing the adjusted integral value of the methyl resonances by 6. The thiol equivalent weight was determined by multiplying this value by the molecular weight of a dimethylsiloxane repeat unit (74.15) and adding the molecular weight of the (3-mercaptopropyl)methylsiloxane moiety (134.27).

Determination of Succinic Anhydride Equivalent Weight for Gelest, Inc. DMS-Z21, Succinic Anhydride Terminated Polydimethylsiloxane by NMR Spectroscopy:

An approximately 20 mg portion of Gelest DMS-Z21 was mixed with ~500 microliters of deuterated tetrahydrofuran (d-THF) in a two dram vial. When the DMS-Z21 was completely dissolved in the d-THF, the resulting solution was transferred to a Wilmad economy grade 5 mm borosilicate NMR tube. The NMR tube was placed in a spinner and pneumatically inserted into a VARIAN 600 MHZ INOVA NMR spectrometer equipped with an inverse NMR probe head. After locking and shimming operations were completed using the deuterium of the d-THF, one dimensional (1D) proton NMR data were collected using a 15° pulse width. One hundred twenty eight (128) transients of 32 k points were collected using a 3-second acquisition time and no recycle delay. The data were Fourier Transformed (FT) without apodisation, linear prediction, or zero filling. Neglecting the residual proto-solvent resonances, the resulting spectrum showed two sets of seven overlapping multiplets, one set assignable to 3-(prop-2-en-1-yl)dihydrofuran-2,5-dione, most likely an unreacted starting material, and the other set assignable to the terminal succinic anhydride moieties on the PDMS, and a large multiplet at 0.10 ppm assignable to the PDMS methyl resonances. For the polymer end group the NMR assignments are as follows: ($^1$H NMR (600 MHz, THF) δ ppm 3.13 (multiplet, 1H, d), 3.02 and 2.65 (magnetically inequivalent multiplet, 2H, e), 1.90 and 1.64 (magnetically inequivalent multiplet, 2H, c), 1.49 (multiplet, 2H, b), 0.62 (multiplet, 2H, a)), i.e.:

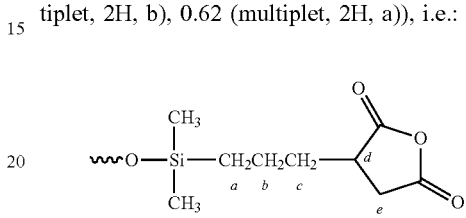

For the 3-(prop-2-en-1-yl)dihydrofuran-2,5-dione, similar assignments are indicated: ($^1$H NMR (600 MHz, THF) δ ppm 5.79 (multiplet, 1H, B), 5.12 (multiplet, 2H, A), 3.25 (multiplet, 1H, D), 3.00 and 2.66 (magnetically inequivalent multiplet, 2H, E), 2.59 and 2.40 (magnetically inequivalent multiplet, 2H, C), i.e.:

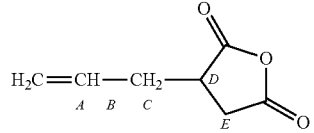

To determine the anhydride equivalent weight, the data were electronically integrated and the integral scale was chosen such that combined integral of the methine proton resonances at 3.13 and 3.25 ppm was one unit. After setting this scale, the integral value of the PDMS methyl resonances centered at 0.10 ppm was used to determine the number of siloxane repeat units —(CH$_3$)$_2$SiO— by dividing the integral value of the PDMS methyl resonances by 6. The anhydride equivalent weight was determined by multiplying this value by the molecular weight of a siloxane repeat unit (74.15) and adding the molecular weight of 3-(prop-2-en-1-yl)dihydrofuran-2,5-dione, which is 140.14 for C$_7$H$_8$O$_3$.

Assessment of Stability of Mixtures of Alkene or Thiol and Organoborane-Base Complex by NMR Spectroscopy:

The mixture of an alkene and organoborane-base complex or the mixture of a thiol and organoborane-base complex in a 2:1 weight ratio was placed in a standard, glass NMR tube, capped with standard plastic cap, and placed in a 120° F. (49° C.) oven. $^1$H and $^{11}$B NMR measurements were obtained at initial (just after formation of the mixture and prior to placement in the oven), 3, 7, and 14 days. Observations were made and noted on the addition of peaks or the broadening of peaks in the NMR spectra indicating the instability or the reactivity of the organoborane-base complex with the alkene or thiol.

The spectrometer was shimmed and referenced using an external standard of deuterated acetone filled to the same level as the samples in the NMR tubes. The NMR tube was placed in a spinner and pneumatically inserted into a VAR- IAN 600 MHZ UNITY INVOA NMR spectrometer equipped with a Varian or Narolac NMR probe head. The NMR samples were run neat without the addition of deuterated solvent. One-dimensional $^1$H spectra were collected using a 15° pulse width. Sixty four (64) transients of 26988 points were collected using a ~4 second acquisition time and no recycle delay. The data were zero-filled to 32 k points and Fourier Transformed (FT) without apodisation or linear prediction. $^{11}$B spectra were collected using a 1 microsecond pulse. Thirty two (32) transients of 40000 points were collected using a 0.8 second acquisition time and a 5 second recycle delay. The data were zero-filled to 65 k points, 9.5 Hz exponential apodization was used and the data was Fourier Transformed without linear prediction.

Determination of reaction was based on observation of new peaks in the protons spectra. Reaction of alkene groups was noted when new broad peaks in the region associated with proton resonances of aliphatic, unsaturated carbon backbones, expected between 2 and 3 ppm, were observed. In the $^{11}$B spectra, new resonances that were assigned to the hydrolysis of the trialkylylborane indicated instability. The $B(R)_3$ adduct with an amine resonated at –5 ppm. Free $B(R)_3$ resonates at approximately 90 ppm. Monohydrolyzed borane $(B(R)_2OR)$ resonates at approximately 55 ppm, and $B(OR)_2R$ resonates at approximately 30 ppm, where R refers to the alkyl group, such as ethyl or butyl group. Qualitative assessments of the stability of the alkene and organoborane-base complex mixtures and thiol and organoborane-base mixtures were made.

MATERIALS USED IN PREPARATORY EXAMPLES AND EXAMPLES

The materials used in the Preparatory Example and Examples are given in Table 1. The descriptive information in Table 1 was provided by the respective suppliers unless specifically noted otherwise.

TABLE 1

List of Materials

| Product Name or Chemical Name or Abbreviation | Description and/or Supplier |
|---|---|
| 8966A | Urethane acrylate with number average molecular weight of 3600 Daltons, available from Japan U-PiCA Company, Ltd. (Tokyo, Japan) |
| N-allylaniline | Available from Sigma-Aldrich (Milwaukee, WI, USA) |
| Allyl butyrate | Available from Sigma-Aldrich (Milwaukee, WI, USA) |
| 1-allyl-imidazole | Available from Sigma-Aldrich (Milwaukee, WI, USA) |
| Allyl phenyl ether | Available from Sigma-Aldrich (Milwaukee, WI, USA) |
| N-allyl-2-pyrrolidinone | Available from Astatech, Inc. (Bristol, PA, USA) |
| APE | Allyl pentaerythritol (i.e., pentaerythritol tetra-allyl ether), available from Perstorp Specialty Chemicals AB (Skane, Sweden) |
| Aziridine | CX-100 crosslinker polyfunctional aziridine, trimethylolpropane tris(2-methyl-1-aziridinepropionate), available from DSM Neoresins (Zwolle, The Netherlands) |
| BPBA | 1-benzyl-5-phenyl barbituric acid, available from Sigma-Aldrich (Milwaukee, WI, USA) |
| Tert-butyl peroxy-3,5,5-trimethylhexanoate | Tert-butyl peroxy-3,5,5-trimethylhexanoate, available from ACROS Organics (Antwerp, Belgium) |
| CAPCURE 3-800 | Multifunctional thiol, having on average roughly 3 thiol groups per molecule, thiol equivalent weight (eq. wt.) equal to approximately 277, available from BASF (Florham Park, NJ, USA) |
| DAM-05 | Spherical alumina with mean particle size of approximately 5 micrometers, available from Denka (official name Denki Kagaku Kogyo Kabushiki Kaisha, Tokyo, Japan) |
| DAM-45 | Spherical alumina with mean particle size of approximately 45 micrometers, available from Denka (Tokyo, Japan) |
| DAS | Diallyl succinate, available from Sigma-Aldrich (Milwaukee, WI, USA) |
| 1,9-decadiene | Available from Sigma-Aldrich (Milwaukee, WI, USA) |
| DEGDVE | di(ethylene glycol) divinyl ether, available from Sigma-Aldrich (Milwaukee, WI, USA) |
| Diallyl isophthalate | Available from Sigma-Aldrich (Milwaukee, WI, USA) |
| Diallyl phthalate | Available from Sigma-Aldrich (Milwaukee, WI, USA) |
| DINA | Diisononyl adipate, available from BASF (Florham Park, NJ, USA) |
| Divinylbenzene | Available from Alfa Aesar GmbH & Co. KG (Karlsruhe, Germany) |
| DMS-V21 | Vinyl-terminated polydimethylsiloxane, also referred to as -vinyl-polydimethylsiloxane, having a kinematic viscosity of 100 centistoke (cSt), available from Gelest, Inc. (Morrisville, PA, USA) |
| DMS-V31 | Vinyl-terminated polydimethylsiloxane, also referred to as -vinyl-polydimethylsiloxane, having a kinematic viscosity of 1000 cSt, available from Gelest, Inc. (Morrisville, PA, USA) |
| DMS-V42 | Vinyl-terminated polydimethylsiloxane, also referred to as --vinyl-polydimethylsiloxane, having a kinematic viscosity of 20000 cSt. available from Gelest, Inc. (Morrisville, PA, USA) |
| DMS-T25 | Polydimethylsiloxane (non-functional) having a kinematic viscosity of 500 cSt, available from Gelest, Inc. (Morrisville, PA, USA) |
| DMS-T35 | Polydimethylsiloxane (non-functional) having a kinematic viscosity of 5000 cSt, available from Gelest, Inc. (Morrisville, PA, USA) |
| DMS-Z21 | Succinic anhydride-terminated polydimethylsiloxane, also referred to as -3-(2-succinic anhydride)propyl-polydimethylsiloxane, having a kinematic viscosity of 75-100 cSt, available from Gelest, Inc. (Morrisville, PA, USA) |

TABLE 1-continued

List of Materials

| Product Name or Chemical Name or Abbreviation | Description and/or Supplier |
|---|---|
| Dodecenyl-succinic anhydride (DDSA) | Available from Sigma-Aldrich (Milwaukee, WI, USA) |
| EGBMP | Ethylene glycol bis(3-mercaptopropionate), also referred to as glycol di(3-mercaptoproprionate), available from Evans Chemetics LP (Teaneck, NJ, USA) |
| IPDI | Isophorone diisocyanate, available from Sigma-Aldrich (Milwaukee, WI, USA) |
| LP-3 | THIOKOL LP-3, avialble from Toray Fine Chemicals Co., Ltd. (Chiba, Japan) |
| Nonanoic acid | Available from Sigma-Aldrich (Milwaukee, WI, USA) |
| Nonyl aldehyde | Available from Sigma-Aldrich (Milwaukee, WI, USA) |
| POLYMERCAPTAN 805C | Mercaptanized castor oil, thiol eq. wt. of about 352, (pre-commercial product) available from Chevron-Phillips (The Woodlands, TX, USA) |
| PGA | Pyrogallic acid, available from Mallinkrodt Chemical Works (St. Louis, MO, USA) |
| SMS-022 | (Mercaptopropyl)methylsiloxane-dimethylsiloxane copolymer having 2-3 mole % (mercaptopropyl)methylsiloxane and a kinematic viscosity of 120-180 cSt, available from Gelest, Inc. (Morrisville, PA, USA) |
| SMS-042 | (Mercaptopropyl)methylsiloxane-dimethylsiloxane copolymer having 4-6 mole-% (mercaptopropyl)methylsiloxane and a kinematic viscosity of 120-170 cSt, available from Gelest, Inc. (Morrisville, PA, USA) |
| SR350 | Trimethylol propane trimethacrylate, available from Sartomer USA, LLC (Exton, PA, USA), |
| SR533 | Triallyl isocyanurate, available from Sartomer USA, LLC (Exton, PA, USA) |
| TEB-DAP | Triethylborane-1,3-diaminopropane complex (with between 4 to 10 weight percent (wt-%) free 1,3-diaminopropane), available from BASF (Ludwigshafen, Germany) |
| TEB-DETA | Triethylborane-diethylenetriamine complex (with free diethylenetriamine). available from BASF (Florham Park, NJ, USA) |
| TMPDE | 2,2-bis(allyloxymethyl)-butan-1-ol, available from Perstorp Specialty Chemicals AB (Skane, Sweden) |
| TMPTMP | Trimethylolpropane tris(3-mercaptopropionate), available from Sigma-Aldrich (Milwaukee, WI, USA) |
| TnBB-MOPA | Tri-n-butylborane-3-methoxypropylamine complex (with between 6 to 9 wt-% free 3-methoxypropylamine per BASF; internal determination by NMR indicated approximately 12 wt-% free 3-methoxypropylamine), available from BASF (Florham Park, NJ, USA) |
| Triallyl trimellitate | Triallyl 1,2,4-benzenetricarboxylate, available from Lancaster Synthesis Inc. (Haverhill, MA, USA), |
| Veova 10 | Vinyl neodecanoate, available from Momentive Specialty Chemicals Inc. (Columbus, OH, USA), |
| VPA | Vinylphosphonic acid, avaialbe from Sigma-Aldrich (Milwaukee, WI) |

Preparatory Example 1

The vinyl and thiol content of the vinyl-terminated and mercapto-functionalized polydimethylsiloxanes, respectively, were determined by both $^1$H NMR and titration as described in the Test Methods section. The anhydride content of DMS-Z21 was determined by $^1$H NMR as described in the Test Methods section. The results were as listed in Table 2.

TABLE 2

Vinyl or Thiol Equivalent Weights of Functionalized Polydimethylsiloxanes

| | Functional Group Equivalent Wt. | |
|---|---|---|
| Material | by $^1$H NMR | by Titration |
| DMS-V21 | 2324 | 2256 |
| DMS-V31 | 8938 | 8505 |
| DMS-V42 | 26198 | 23518 |
| SMS-022 | 3682 | 3900 |
| SMS-042 | 1916 | 1903 |
| DMS-Z21 | 440* | — |

*The anhydride equivalent weight for succinic anhydride-terminated polydimethylsiloxane in DMS-Z21 was approximately 465, however DMS-Z21 also contained a small amount of an anhydride endcapping agent, 3-(prop-2-en-1-yl)dihydrofuran-2,5-dione, which lowered the overall anhydride equivalent weight for DMS-Z21 to 440.

Preparatory Examples 2-20 (PE-2 to PE-23)

Several compositions were prepared by adding 2 grams of an alkene and 1 grams of organoborane-base complex to a 2-dram (7 mL) vial and agitating. Not all the alkenes were polyfunctional with respect to ethylenically unsaturated groups. That is, several were monofunctional. They were included in order to evaluate the stability of the organoborane-base complex with a broader selection of compounds that fall within specific chemical classes. Two compositions were prepared by adding 2 grams of a polyfunctional thiol and 1 gram of organoborane-base complex to a 2-dram (7 mL) vial and agitating. Amounts of each composition were added to separate NMR tubes and placed in a 120° F. (49° C.) oven. $^1$H and $^{11}$B NMR spectra were obtained at 0, 3, 7, and 14 days of 120° F. (49° C.) exposure as described in the Test Methods section. Observations were made regarding the color of the compositions and addition of peaks or the broadening of peaks in the NMR spectra, suggestive of instability and/or reactivity of the alkylborane-base complex with the multifunctional alkene. Results are reported in Table 3, wherein "S" means that the composition appeared stable after 14 days at 120° F. (49° C.) as determined by the designated NMR technique ($^1$H or $^{11}$B); "NS" means that the composition did not appear stable after 14 days at 120° F. (49° C.) as determined by the designated NMR technique ($^1$H or $^{11}$B).

more stable in relation to other compositions in Table 3, and thus were particularly suitable for Part A.

Preparatory Example 24 (PE-24)

A composition of trimethylolpropane triacrylate, SR351, and TEB-DAP was made. TEB-DAP, 0.0384 grams, was weighed into a 8 mL glass vial, and then 1.7511 grams SR351 were weighed into the same glass vial. After weighing the components into the glass vial, they were immediately hand mixed with a wooden applicator stick, which was approximately 2.5 mm in diameter. Upon mixing, the composition immediately began to react, and a hard polymeric layer of approximately 1 mm in thickness formed on the top

TABLE 3

Stability of Various Mixtures

| Sample | Organoborane-Base Complex | Alkene or Thiol | NMR Stability $^1$H | NMR Stability $^{11}$B | Comments |
|---|---|---|---|---|---|
| PE-2 | TEB-DAP | SR533 | S | S | Clear-yellow; no additional peaks |
| PE-3 | TEB-DAP | Aziridine (included for comparison) | NS | S | Clear; 1H, increasing broadening with time indicative of increase in viscosity |
| PE-4 | TEB-DAP | APE | S | S | Clear; no additional peaks |
| PE-5 | TEB-DAP | N-allyl-2-pyrrolidinone | S | S | Vlear; no additional peaks |
| PE-6 | TEB-DAP | 1-allyl-imidazole | NS | S | Yellow; multiple borane peaks may be the result of exchange and formation of an adduct with the diluent or phase separation |
| PE-7 | TEB-DAP | N-allylaniline | S | S | Red; no additional peaks |
| PE-8 | TEB-DAP | Allyl phenyl ether | S | S | Red; no additional peaks |
| PE-9 | TEB-DAP | Triallyl trimellitate | NS | S | Yellow; 1H, peaks changing at 3.5-4.0 ppm |
| PE-10 | TEB-DAP | Veova 10 | NS | S | Clear; boron peak broadens, growing peaks at 3.0-4.0 ppm |
| PE-11 | TEB-DAP | TMPDE 90 | S | S | Clear; no additional peaks |
| PE-12 | TEB-DAP | Allyl butyrate | NS | S | Clear; 1H, peaks growing with time, 2.5 to 4.5 ppm; 11B, peak broadening |
| PE-13 | TEB-DAP | Diallyl isophthalate | NS | S | Clear, precipitate formed; 1H, peaks growing in with time, 4.0 to 4.5 ppm, 5.7 ppm |
| PE-14 | TEB-DAP | Diallyl phthalate | NS | S | Clear, precipitate formed; 1H, peaks growing, 8.6, 9.6, and 11.7 ppm |
| PE-15 | TnBB-MOPA | SR533 | S | S | Clear; no additional peaks |
| PE-16 | TnBB-MOPA | N-allyl-2-pyrrolidinone | S | S | Red-yellow; no additional peaks |
| PE-17 | TEB-DETA | SR533 | S | S | Clear; no additional peaks |
| PE-18 | TEB-DETA | N-allyl-2-pyrrolidinone | S | S | Yellow; no additional peaks |
| PE-19 | TEB-DAP | Divinylbenzene | NS | NS | Solid formed; 1H, peaks growing, boron peak growing |
| PE-20 | TEB-DAP | 1,9-decadiene | S | S | Clear; 1H, no additional peaks; 11B, small peak at ~30 ppm present at start, but does not grow with time |
| PE-21 | TEB-DAP | DEGDVE | S | S | Clear; no additional peaks |
| PE-22 | TEB-DAP | TMPTMP | NS | NS | 1H, appearance of acid proton, decrease in ester protons; 11B, small peak at ~3 ppm growing with time |
| PE-23 | TEB-DAP | POLYMERCAPTAN 805C | NS | NS | 1H, all peaks broaden significantly with time; 11B, small peak at ~10 ppm growing with time |

From Table 3 it was evident that compositions of trialkylborane-amine complexes and allyl ethers, allyl amides, including triallyl isocyanurate (SR533), vinyl ethers, and vinyl alkyls (e.g., PE-2, PE-4, PE-5, PE-8, PE-11, PE-15, PE-16, PE-17, PE-18, PE-20, and PE-21) were generally surface. The vial was capped, kept at room temperature (approximately 21° C.), and observed periodically. After 2 hours, the liquid that was initially present beneath the hard polymeric layer had gelled. After 46 hours, the entire composition was a hard polymeric material.

Preparatory Example 25 (PE-25)

A composition of trimethylolpropane trimethacrylate, SR350, and TEB-DAP was made. TEB-DAP, 0.0373 g, was weighed into a 8 mL glass vial, and then 1.8747 grams SR350 were weighed into the same glass vial. After weighing the components into the glass vial, they were immediately hand mixed with a wooden applicator stick, which was approximately 2.5 mm in diameter. After mixing, the vial was capped, kept at room temperature (approximately 21° C.), and observed periodically. After 21 days, the color of the composition had changed from initially colorless with perhaps an extremely faint yellow tint to a more pronounced gold tint. The composition did not undergo any noticeable change in its consistency, i.e., it remained a low viscosity liquid. After 44 days, a polymeric gel had formed in the vial. The gel was approximately half the volume of the composition, and it resided on the bottom of the vial with a liquid layer on top.

As used in the following Examples and Comparative Examples, the terms "polymeric gel", "rubbery solid", and "solid" (or equivalent language) are used to describe the cured materials and are a qualitative assessment of the nature of the cured materials after a specified time, and in general reflect increasing stiffness in going from polymeric gel to rubbery solid (or rubber) to solid.

Example 1

A 2-part composition was prepared that contained a vinyl-terminated polydimethylsiloxane (PDMS), which was DMS-V31, a mercapto-functional PDMS, which was SMS-042, a non-functional PDMS, which was DMS-T35, a trialkylborane-amine complex, which was TnBB-MOPA, and a decomplexing agent, which was DMS-Z21. The components of Part A were weighed into a glass vial and mixed, while the components of Part B were weighed into a separate glass vial and mixed. The contents of Part A and Part B were as listed in Table 4. All the individual components and Parts A and B were liquids at room temperature.

TABLE 4

| Composition of Example 1 | |
|---|---|
| Components | Weight (grams) |
| Part A | |
| TnBB-MOPA | 0.1012 |
| SMS-042 | 0.6006 |
| DMS-T35 | 0.3045 |
| Part B | |
| DMS-Z21 | 0.1936 |
| DMS-V31 | 4.0655 |

Then 1.7114 grams of Part B were added at room temperature (approximately 21° C.) to a circular aluminum tin or pan, which was approximately 50 mm in diameter, followed by 0.2952 grams of Part A to afford a mixture with approximately 1.5 wt-% TnBB-MOPA based on the total weight of the mixture. The mixture was immediately hand stirred with a wooden applicator stick, which was approximately 2.5 mm in diameter. The mixture began to gel in approximately 10 seconds, and cured to a polymeric gel in approximately 30 seconds.

Comparative Example 1

Comparative Example 1 was similar to Example 1, except that no mercapto-functional PDMS, which was SMS-042, was added. The amount of SMS-042 in Example 1 was replaced with non-functional PDMS, which was DMS-T35, in Part A. Part B was the same as in Example 1. The contents of Part A and Part B were as listed in Table 5. All the individual components and Parts A and B were liquids at room temperature.

TABLE 5

| Composiiton of Comparative Example 1 | |
|---|---|
| Components | Weight (g) |
| Part A | |
| TnBB-MOPA | 0.1020 |
| DMS-T35 | 0.8963 |
| Part B | |
| DMS-Z21 | 0.1936 |
| DMS-V31 | 4.0655 |

Then 1.7018 grams of Part B were added at room temperature (approximately 21° C.) to a circular aluminum tin or pan, which was approximately 50 mm in diameter, followed by 0.2922 grams of Part A to afford a mixture with approximately 1.5 wt-% TnBB-MOPA based on the total weight of the mixture. The mixture was immediately hand stirred with a wooden applicator stick for 3-5 minutes, and the material did not undergo any noticeable change in its physical nature or consistency. The mixture was allowed to sit for 1 hour and 15 minutes while occasionally being stirred, and no change was observed. The mixture remained a liquid.

Example 2

A 2-part composition was made that contained a divinyl compound, which was 1,9-decadiene, a multi-functional thiol compound, which was POLYMERCAPTAN 805C, a trialkylborane-amine complex, which was TEB-DAP, and a decomplexing agent, which was DDSA. The components of Part A were weighed into a glass vial and mixed. The components of Part B were weighed directly into a circular aluminum tin or pan, which was approximately 50 mm in diameter, and mixed with a wooden applicator stick. The contents of Part A and Part B were as listed in Table 6. All the individual components and Parts A and B were liquids at room temperature.

TABLE 6

| Composition of Example 2 | |
|---|---|
| Components | Weight (g) |
| Part A | |
| TEB-DAP | 0.0209 |
| POLYMERCAPTAN 805C | 1.9791 |
| Part B | |
| DDSA | 0.0294 |
| 1,9-decadiene | 0.5090 |

Then 1.4157 grams of Part A were added at room temperature (approximately 21° C.) to the circular aluminum tin or pan, which contained Part B, to afford a mixture with approximately 0.76 wt-% TEB-DAP based on the total weight of the mixture. The mixture was immediately hand stirred with a wooden applicator stick, and the mixture cured to a very firm rubber (rubbery solid) in approximately 1 minute and 40 seconds.

Comparative Example 2

Comparative Example 2 was similar to Example 2, except the polyfunctional thiol, which was POLYMERCAPTAN 805C, was not used, and 1,9-decadiene was present in both Part A and Part B. The components of Part A and Part B were weighed into separate glass vials and mixed. The contents of Part A and Part B were as listed in Table 7. All the individual components and Parts A and B were liquids at room temperature.

TABLE 7

Composition of Comparative Example 2

| Components | Weight (grams) |
|---|---|
| Part A | |
| TEB-DAP | 0.0304 |
| 1,9-decadiene | 0.3761 |
| Part B | |
| DDSA | 0.0440 |
| 1,9-decadiene | 0.3747 |

Then 0.2829 grams of Part B were weighed into another glass vial, followed by the addition of 0.2771 grams of Part A at room temperature, and the contents hand stirred with a wooden applicator stick for 5 minutes. The contents did not undergo any noticeable change in its consistency, i.e., it remained a low viscosity liquid. The sample was set aside without stirring and observed occasionally throughout 48 hours, and no noticeable change in consistency was observed. The sample remained a liquid.

Example 3

A 2-part composition containing a silicone resin curable by thiol-ene reaction and the thermally conductive filler, spherical alumina, was made. To a plastic mixing cup, Cup 1, the components in Table 8 were added and then mixed in a centrifugal mixer (SPEEDMIXER DAC 150 from Flack Tek Inc., Landrum, S.C. USA), at 3000 revolutions per minute (rpm) for 1 minute.

TABLE 8

Composition of Cup 1 for Example 3

| Components | Weight (grams) |
|---|---|
| DMS-V21 | 4.3357 |
| SMS-022 | 2.2175 |
| SMS-042 | 2.2137 |

To a separate plastic mixing cup, Cup 2, the components in Table 9 were added and then hand mixed with a wooden applicator stick for approximately 1 minute.

TABLE 9

Composition for Cup 2 in Example 3

| Components | Weight (grams) |
|---|---|
| TnBB-MOPA | 0.4055 |
| DMS-V21 | 4.3333 |

To a separate plastic mixing cup, Cup 3, 31.5014 grams DAM-45, 19.5020 grams DAM-05, and 5.9314 grams of the contents of Cup 1 were added and then mixed in a centrifugal mixer (SPEEDMIXER DAC 150) at 3000 rpm for 1 min. The contents were allowed to cool back to room temperature (mixing with the fillers generates some heat). Then 3.0660 grams of the contents of Cup 2 were added to Cup 3, the contents hand stirred with a wooden applicator stick for approximately 1 min, and then mixed in the centrifugal mixer at 1000 rpm for 30 seconds. The final composition in Cup 3, which was Part A, is shown in Table 10.

TABLE 10

Composition of Cup 3 in Example 3 (Part A)

| Components | Weight (grams) |
|---|---|
| DAM-45 | 31.5014 |
| DAM-05 | 19.5020 |
| Cup 1 Composition | 5.9314 |
| Cup 2 Composition | 3.0660 |

To a separate plastic mixing cup, Cup 4, the components listed in Table 11 were added and then mixed in the centrifugal mixer at 3000 rpm for 30 seconds. The contents of Cup 4 were Part B.

TABLE 11

Composition of Cup 4 in Example 3 (Part B)

| Components | Weight (g) |
|---|---|
| DMS-Z21 | 1.0472 |
| DMS-T25 | 1.1414 |

Then Parts A and B were added to separate chambers or bores of a molded, plastic cartridge (3M SCOTCH-WELD ADHESIVE DUO-PAK CARTRIDGE for 10:1 volume:volume mix ratio) that can be used for holding and dispensing 2-part adhesives or resins. The cartridge had 2 chambers or bores of equal length, but different diameter, such that one chamber had a volume of approximately 35 ml and the other chamber was approximately 3.5 mL. Part A (45.7343 grams) was added to the larger chamber, and Part B (1.7882 grams) was added to the smaller chamber. This resulted in the chambers being filled to approximately the same height, and the chambers were roughly half full. Seals were then placed in the chambers and excessive air bled from the chambers as the seals were positioned directly over the mixtures. The cartridge was then attached to a manual applicator gun (obtained from 3M Co., St. Paul, Minn., under the trade designation "3M EPX PLUS II APPLICATOR"), and the plug at the tip of the cartridge where the contents of the chambers would be dispensed was removed and replaced with a static mixing nozzle (about 103 mm long, obtained from 3M Co., St. Paul, Minn., under the trade designation "3M SCOTCH-WELD EPX 10 TO 1 MIXING NOZZLE"). The contents of the chambers at room temperature were then dispensed through the mixing nozzle and the first couple of grams discarded. A stopwatch was started immediately upon dispensing of the material. The next 20.3577 grams were dispensed into a circular aluminum tin or pan, which was approximately 50 mm in diameter. It took approximately 15-20 seconds to dispense the 20.3577 grams into the aluminum tin. The top surface of the material in the tin cured within a minute or two from the start of the stopwatch to form a skin layer over the rest of the material. Curing through the entire thickness of the material in the tin took approximately 4 hours and 30 min, and provided a highly filled, polymeric, silicone gel (polymeric gel). The material in the tin was roughly 5 mm thick.

Example 4

While the cure of the 2-part composition in Example 3 was effective, faster cures through the thickness of the sample could be desired. In Example 3, the top surface of the material (i.e., the material at the air interface) cured very rapidly, while the rest of the material below the top surface and not at the air interface cured more slowly. This indicated that the ability of oxygen to diffuse into this highly filled (about 85 wt-% spherical alumina) sample may be limiting the cure rate below the top surface. In hopes of increasing the cure rate through the thickness of these highly filled samples, a peroxygen compound, tert-butyl peroxy-3,5,5-trimethylhexanoate, was added to the 2-part composition.

To a plastic mixing cup, Cup 5, the components in Table 12 were added and then mixed in a centrifugal mixer (SPEEDMIXER DAC 150) at 3000 rpm for 1 min.

TABLE 12

Composition of Cup 5 of Example 4

| Components | Weight (grams) |
|---|---|
| DMS-V21 | 4.3349 |
| SMS-022 | 2.2205 |
| SMS-042 | 2.2145 |

To a separate plastic mixing cup, Cup 6, the components in Table 13 were added and then hand mixed with a wooden applicator stick for approximately 1 minute.

TABLE 13

Composition of Cup 6 of Example 4

| Components | Weight (grams) |
|---|---|
| TnBB-MOPA | 0.4068 |
| DMS-V21 | 4.3386 |

To a separate plastic mixing cup, Cup 7, 31.5019 grams DAM-45, 19.5025 grams DAM-05, and 5.9289 grams of the contents of Cup 5 were added and then mixed in a centrifugal mixer (SPEEDMIXER DAC 150) at 3000 rpm for 1 minute. The contents were allowed to cool back to room temperature (mixing with the fillers generates some heat). Then 3.0736 grams of the contents of Cup 6 were added to Cup 7, the contents hand stirred with a wooden applicator stick for approximately 1 minute, and then mixed in the centrifugal mixer at 1000 rpm for 30 seconds. The final composition in Cup 7, which was Part A, is shown in Table 14.

TABLE 14

Composition of Cup 7 of Example 4 (Part A)

| Components | Weight (grams) |
|---|---|
| DAM-45 | 31.5019 |
| DAM-05 | 19.5025 |
| Cup 5 Composition | 5.9289 |
| Cup 6 Composition | 3.0736 |

To a separate plastic mixing cup, Cup 8, the components in Table 15 were added and then mixed in the centrifugal mixer at 3000 rpm for 30 seconds. The contents of Cup 8 were Part B.

TABLE 15

Composition of Cup 8 of Example 4 (Part B)

| Components | Weight (grams) |
|---|---|
| DMS-Z21 | 1.0473 |
| DMS-T25 | 0.9278 |
| tert-butyl peroxy-3,5,5-trimethylhexanoate | 0.2131 |

Then Parts A and B were added to separate chambers or bores of a molded, plastic cartridge (3M SCOTCH-WELD ADHESIVE DUO-PAK CARTRIDGE for 10:1 volume: volume mix ratio) that can be used for holding and dispensing 2-part adhesives or resins. The cartridge had 2 chambers or bores of equal length, but different diameter, such that one chamber had a volume of approximately 35 mL and the other chamber was approximately 3.5 mL. Part A (45.1873 grams) was added to the larger chamber, and Part B (1.9497 grams) was added to the smaller chamber. This resulted in the chambers being filled to approximately the same height, and the chambers were roughly half full. Seals were then placed in the chambers and excessive air bled from the chambers as the seals were positioned directly over the mixtures. The cartridge was then attached to a manual applicator gun (obtained from 3M Co., St. Paul, Minn., under the trade designation "3M EPX PLUS II APPLICATOR"), and the plug at the tip of the cartridge where the contents of the chambers would be dispensed was removed and replaced with a static mixing nozzle (about 103 mm long, obtained from 3M Co., St. Paul, Minn., under the trade designation "3M SCOTCH-WELD EPX 10 TO 1 MIXING NOZZLE"). The contents of the two chambers at room temperature were then dispensed through the mixing nozzle and the first couple of grams discarded. A stopwatch was started immediately upon dispensing of the material. The next 20.5992 grams were dispensed into a circular aluminum tin or pan, which was approximately 50 mm in diameter. It took approximately 15-20 seconds to dispense the 20.5992 grams into the aluminum tin. The top surface of the material in the tin cured within a minute or two from the start of the stopwatch to form a skin layer over the rest of the material. Curing through the entire thickness of the material in the tin took approximately 2 hours and 30 minutes, and provided a highly filled, polymeric, silicone gel. The material in the tin was roughly 5 mm thick. The addition of the peroxygen compound, tert-butyl peroxy-3,5,5-trimethylhexanoate, reduced the time required to cure through the entire thickness of the highly filled and relatively thick sample.

Example 5

A 2-part composition was made that contained an allyl ether, which was APE, a polyfunctional thiol, which was TMPTMP, a trialkylborane-amine complex, which was TEB-DAP, and a decomplexing agent, which was DDSA. The components of Part A were weighed into a glass vial and mixed. The components of Part B were weighed directly into a circular aluminum tin or pan, which was approximately 50 mm in diameter, and mixed with a wooden applicator stick. The contents of Part A and Part B were as listed in Table 16. All the individual components and Parts A and B were liquids at room temperature.

TABLE 16

Composition of Example 5

| Components | Weight (grams) |
|---|---|
| Part A | |
| TEB-DAP | 0.0372 |
| APE | 1.4528 |
| Part B | |
| DDSA | 0.0490 |
| TMPTMP | 1.4661 |

Then 0.9973 grams of Part A were added at room temperature (approximately 21° C.) to the circular aluminum tin or pan, which contained Part B, to afford a mixture with approximately 0.99 wt-% TEB-DAP based on the total weight of the mixture. The mixture was immediately hand stirred with a wooden applicator stick, and the mixture cured to a solid in approximately 2 minutes.

Comparative Example 3

Comparative Example 3 was similar to Example 5, except TMPTMP was not used. The components of Part A were weighed into a glass vial and mixed Part B was a single component, DDSA, and 0.0501 grams were weighed into an approximately 50 mm diameter, circular aluminum tin or pan. The contents of Part A and Part B were as listed in Table 17.

TABLE 17

Composition of Comparative Example 3

| Components | Weight (g) |
|---|---|
| Part A | |
| TEB-DAP | 0.0388 |
| APE | 1.4620 |
| Part B | |
| DDSA | 0.0501 |

Then 0.9993 grams of Part A were added at room temperature (approximately 21° C.) to the circular aluminum tin or pan, which contained Part B, to afford a mixture with approximately 2.5 wt-% TEB-DAP based on the total weight of the mixture. The mixture was immediately hand stirred for 5 minutes with a wooden applicator stick. The mixture did not undergo any noticeable change in its consistency (i.e., it remained a liquid0. The sample was set aside without stirring and observed occasionally throughout 48 hours, and no noticeable change in consistency was observed. The sample remained a liquid.

Example 6

A 2-part composition was made that contained an allyl ether, which was APE, a polyfunctional thiol, which was CAPCURE 3-800, a trialkylborane-amine complex, which was TEB-DAP, and a decomplexing agent, which was nonanoic acid. The components of Part A were weighed into a glass vial and mixed, while the components of Part B were weighed into a separate glass vial and mixed. The contents of Part A and Part B were as listed in Table 18. All the individual components and Parts A and B were liquids at room temperature.

TABLE 18

Composition of Example 6

| Components | Weight (grams) |
|---|---|
| Part A | |
| TEB-DAP | 0.0377 |
| APE | 0.7745 |
| Part B | |
| Nonanoic Acid | 0.0444 |
| CAPCURE 3-800 | 2.9005 |

Then 1.9551 grams of Part B were added at room temperature (approximately 21° C.) to a circular aluminum tin or pan, which was approximately 50 mm in diameter, followed by 0.5488 grams of Part A to afford a mixture with approximately 1.0 wt-% TEB-DAP based on the total weight of the mixture. The mixture was immediately hand stirred with a wooden applicator stick for 5 minutes, and the material did not undergo any noticeable change in its consistency. The sample was set aside without stirring and observed occasionally. After 45 minutes from the combining of Parts A and B, the sample was still a liquid. After 2 hours from the combining of Parts A and B, an elastomeric, skin layer, i.e., a polymeric film, had formed at the top of the sample at the air interface. A wooden applicator stick was used to break through the skin layer and mix it into the fluid below. After 6 minutes of hand stirring, the entire contents gelled. The stirring was stopped, and 22 minutes later, the sample had cured into a rubbery solid.

Example 7

A 2-part composition was made that contained an allyl ether, which was APE, an allyl ester, which was DAS, a polyfunctional thiol, which was CAPCURE 3-800, a trialkylborane-amine complex, which was TEB-DAP, and a decomplexing agent, which was DDSA. The components of Part A were weighed into a glass vial and mixed, while the components of Part B were weighed into a separate glass vial and mixed. The contents of Part A and Part B were as listed in Table 19. All the individual components and Parts A and B were liquids at room temperature.

TABLE 19

Composition of Example 7

| Components | Weight (grams) |
|---|---|
| Part A | |
| TEB-DAP | 0.0374 |
| APE | 0.3502 |
| Part B | |
| DDSA | 0.0739 |
| DAS | 0.4734 |
| CAPCURE 3-800 | 2.9304 |

Then 2.3181 grams of Part B were added at room temperature (approximately 21° C.) to a circular aluminum tin or pan, which was approximately 50 mm in diameter, followed by 0.2589 grams of Part A to afford a mixture with approximately 0.97 wt-% TEB-DAP based on the total weight of the mixture. The mixture was immediately hand stirred with a wooden applicator stick for 5 minutes, and the material did not undergo any noticeable change in its consistency. The sample was set aside without stirring and observed occasionally. After 30 minutes from the combining of Parts A and B, the sample was still a liquid. After 1 hour and 45 minutes from the combining of Parts A and B, an elastomeric, skin layer had formed at the top of the sample at the air interface. A wooden applicator stick was used to break through the skin layer and mix it into the fluid below. After approximately 1 minute of hand stirring, the entire contents gelled. The stirring was stopped, and 19 minutes later, the sample had cured into a rubbery solid.

Example 8

A 2-part composition that contained APE, SR533, TMPTMP, TEB-DAP, and nonanoic acid was made. The components of Part A were weighed into a glass vial and mixed, while the components of Part B were weighed into a separate glass vial and mixed. The contents of Part A and Part B were as listed in Table 20.

TABLE 20

| Composition of Example 8 | |
| --- | --- |
| Components | Weight (grams) |
| Part A | |
| TEB-DAP | 0.0371 |
| APE | 0.1742 |
| SR533 | 1.2208 |
| Part B | |
| Nonanoic Acid | 0.0652 |
| TMPTMP | 2.2557 |

Then 1.5472 grams of Part B were added at room temperature (approximately 21° C.) to a circular aluminum tin or pan, which was approximately 50 mm in diameter, followed by 0.9537 grams of Part A to afford a mixture with approximately 0.99 wt-% TEB-DAP based on the total weight of the mixture. The mixture was immediately hand stirred with a wooden applicator stick, and the mixture cured to a rubbery solid in approximately 20 seconds, after which the material could no longer be stirred. After approximately 4 minutes from the start of mixing, the material had become a hard solid.

Example 9

A 2-part composition that contained 8966A, EGBMP, TMPTMP, TnBB-MOPA, DDSA, and a plasticizer, which was DINA, was made. The components of Part A were weighed into a glass vial and mixed, while the components of Part B were weighed into a separate glass vial and mixed. The contents of Part A and Part B were as listed in Table 21. All the individual components and Parts A and B were liquids at room temperature.

TABLE 21

| Composition of Example 9 | |
| --- | --- |
| Components | Weight (grams) |
| Part A | |
| TnBB-MOPA | 0.1863 |
| EGBMP | 0.1697 |

TABLE 21-continued

| Composition of Example 9 | |
| --- | --- |
| Components | Weight (grams) |
| TMPTMP | 0.0846 |
| DINA | 0.9982 |
| Part B | |
| DDSA | 0.1828 |
| 8966A | 3.1289 |
| DINA | 1.5126 |

Then 1.9317 grams of Part B were added at room temperature (approximately 21° C.) to a circular aluminum tin or pan, which was approximately 50 mm in diameter, followed by 0.5698 grams of Part A to afford a mixture with approximately 2.9 wt-% TnBB-MOPA based on the total weight of the mixture. The mixture was immediately hand stirred with a wooden applicator stick, and the mixture cured to an elastomeric rubber in approximately 1 minute and 45 seconds.

Example 10

A 2-part composition was prepared that contained DEGDVE, POLYMERCAPTAN 805C, TEB-DAP, and DDSA. The components of Part A were weighed into a glass vial and mixed, while the components of Part B were weighed into a separate glass vial and mixed. The contents of Part A and Part B were as listed in Table 22. All the individual components and Parts A and B were liquids at room temperature.

TABLE 22

| Composition of Example 10 | |
| --- | --- |
| Components | Weight (grams) |
| Part A | |
| TEB-DAP | 0.0367 |
| DEGDVE | 1.0305 |
| Part B | |
| DDSA | 0.0730 |
| POLYMERCAPTAN 805C | 2.6030 |

Then 1.7827 grams of Part B were added at room temperature (approximately 21° C.) to a circular aluminum tin or pan, which was approximately 50 mm in diameter, followed by 0.7042 grams of Part A to afford a mixture with approximately 0.97 wt-% TEB-DAP based on the total weight of the mixture. The mixture was immediately hand stirred with a wooden applicator stick for 5 minutes, and the material did not undergo any noticeable change in its consistency. The sample was set aside without stirring and after 11 minutes and 30 sec from the start of stirring, the viscosity of the sample had increased. Stirring was resumed, and the material became a tacky, polymeric gel after approximately 15 minutes and 30 seconds from the start of the initial stirring.

Example 11

A 2-part composition was prepared that contained an allyl ether, which was APE, a polyfunctional thiol, which was TMPTMP, a trialkylborane-amine complex, which was TEB-DAP, and a decomplexing agent, which was nonyl aldehyde. The components of Part A were weighed into a glass vial and mixed, while the components of Part B were weighed into a separate glass vial and mixed. The contents of Part A and Part B were as listed in Table 23. All the individual components and Parts A and B were liquids at room temperature.

TABLE 23

Composition of Example 11

| Components | Weight (grams) |
|---|---|
| Part A | |
| TEB-DAP | 0.0369 |
| APE | 1.3130 |
| Part B | |
| Nonyl Aldehyde | 0.0388 |
| TMPTMP | 2.3606 |

Then 1.6034 grams of Part B were added at room temperature (approximately 21° C.) to a circular aluminum tin or pan, which was approximately 50 mm in diameter, followed by 0.8930 grams of Part A to afford a mixture with approximately 0.98 wt-% TEB-DAP based on the total weight of the mixture. The mixture was immediately hand stirred with a wooden applicator stick for 5 minutes, and the viscosity of the material increased slightly, but remained a liquid. The sample was set aside without stirring, and observed at 30 minutes after combination of Parts A and B. A skin layer had formed at the top of the sample at the air interface. A wooden applicator stick was used to break through the skin layer and mix it into the fluid below. After 3 minutes of hand stirring and 33 minutes after combination of Parts A and B, the entire contents gelled into a soft, rubbery material. The stirring was stopped, and 45 minutes after combination of the parts, the sample was firmer, but still a rubbery solid.

Example 12

A 2-part composition was prepared that contained an allyl ether, which was APE, a polyfunctional thiol, which was TMPTMP, a trialkylborane-amine complex, which was TEB-DAP, and a 1,3-dicarbonyl decomplexing agent, which was BPBA. The components of Part A were weighed into a glass vial and mixed, while the components of Part B were weighed into a separate glass vial and mixed. BPBA, a solid at room temperature, did not dissolve in TMPTMP rapidly. Both vials were capped and held overnight. The next day, Part B was occasionally stirred with a wooden applicator stick, after which all or the vast majority of the BPDA dissolved in the TMPTMP. The contents of Part A and Part B were as listed in Table 24.

TABLE 24

Composition of Example 12

| Components | Weight (grams) |
|---|---|
| Part A | |
| TEB-DAP | 0.0389 |
| APE | 1.2985 |
| Part B | |
| BPBA | 0.0818 |
| TMPTMP | 2.3347 |

Then 1.6122 grams of Part B were added at room temperature (approximately 21° C.) to a circular aluminum tin or pan, which was approximately 50 mm in diameter, followed by 0.8920 grams of Part A to afford a mixture with approximately 1.0 wt-% TEB-DAP based on the total weight of the mixture. The mixture was immediately hand stirred with a wooden applicator stick, and the mixture cured to a rubbery solid in approximately 5 to 10 seconds, after which the material could no longer be stirred. After approximately 1 minute from the start of mixing, the material had become a stiffer solid.

Example 13

A 2-part composition was prepared that contained APE, SR350, TMPTMP, TEB-DAP, a decomplexing agent, which was VPA, and a free radical inhibitor or stabilizer, which was PGA. The components of Part A were weighed into a 8 mL glass vial and mixed, while the components of Part B were weighed into a separate 8 mL glass vial and mixed. The contents of Part A and Part B were as listed in Table 25.

TABLE 25

Composition of Example 13

| Components | Weight (grams) |
|---|---|
| Part A | |
| TEB-DAP | 0.0379 |
| APE | 0.7264 |
| Part B | |
| VPA | 0.0304 |
| SR350 | 1.1966 |
| TMPTMP | 4.7689 |
| PGA | 0.0034 |

Then 1.9963 grams of Part B were added at room temperature (approximately 21° C.) to a 25 mL glass vial, followed by 0.5123 grams of Part A to afford a mixture with approximately 1.0 wt-% TEB-DAP based on the total weight of the mixture. The mixture was immediately hand stirred with a wooden applicator stick, and the mixture cured to a solid in approximately 3 minutes and 30 seconds.

Example 14

A 2-part composition that contained APE, LP-3, TnBB-MOPA, and DDSA was made. The components of Part A were weighed into a glass vial and mixed, while the components of Part B were weighed into a separate glass vial and mixed. The contents of Part A and Part B were as listed in Table 26.

TABLE 26

Composition of Example 14

| Components | Weight (grams) |
|---|---|
| Part A | |
| TnBB-MOPA | 0.1147 |
| APE | 0.4612 |
| Part B | |
| DDSA | 0.1085 |
| LP-3 | 3.0747 |

Then 2.1167 grams of Part B were added at room temperature (approximately 21° C.) to a circular aluminum tin or pan, which was approximately 50 mm in diameter, followed by 0.3823 grams of Part A to afford a mixture with approximately 3.0 wt-% TnBB-MOPA based on the total weight of the mixture. The mixture was immediately hand stirred with a wooden applicator stick for 5 minutes, and the material did not undergo any noticeable change in its consistency. The sample was set aside without stirring and observed occasionally. After 50 minutes from the combining of Parts A and B, a skin layer had formed at the top of the sample at the air interface. A wooden applicator stick was used to break through the skin layer and mix it into the fluid below, and the contents were mixed for 5 minutes and then set aside. After 115 minutes from the combining of Parts A and B, a skin layer had again formed at the top of the sample at the air interface. A wooden applicator stick was used to break through the skin layer and mix it into the fluid below, and the contents were mixed for 5 minutes and then set aside. After 155 minutes from the combining of Parts A and B, no skin layer was present and the sample was stirred for another 5 minutes and then set aside. The sample had become much more viscous. After 230 minutes from the combining of Parts A and B, the sample had become a polymeric gel.

Example 15

A 2-part composition that contained APE, TMPTMP, TnBB-MOPA, and IPDI was made. The components of Part A were weighed into a glass vial and mixed, while the components of Part B were weighed into a separate glass vial and mixed. The contents of Part A and Part B were as listed in Table 27.

TABLE 27

Composition of Example 15

| Components | Weight (grams) |
|---|---|
| Part A | |
| TnBB-MOPA | 0.1137 |
| APE | 1.2199 |
| Part B | |
| IPDI | 0.2238 |
| TMPTMP | 2.1960 |

Then 1.6192 grams of Part B were added at room temperature (approximately 21° C.) to a circular aluminum tin or pan, which was approximately 50 mm in diameter, followed by 0.9002 grams of Part A to afford a mixture with approximately 3.0 wt-% TnBB-MOPA based on the total weight of the mixture. The mixture was immediately hand stirred with a wooden applicator stick, and the mixture gelled in about 10 seconds and cured to a solid in approximately 30 seconds.

All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A polymerizable composition comprising:
   an organoborane-base complex, wherein the base is a complexing agent selected from a compound having one or more amine groups, amidine groups, hydroxide groups, alkoxide groups, or a combination thereof, wherein the complexing agent is free of aziridines;
   a decomplexing agent that liberates the organoborane from the organoborane-base complex, wherein the decomplexing agent comprises a 1,3-dicarbonyl compound;
   a polymerizable thiol-containing component comprising at least one polymerizable thiol-containing compound having a plurality of thiol groups in which the sulfur atom of the thiol group is covalently bonded to carbon; and
   a polymerizable ethylenically unsaturated component comprising at least one polymerizable ethylenically unsaturated compound having a plurality of ethylenically unsaturated groups;
   wherein the total amount of the thiol-containing and ethylenically unsaturated compounds total at least 50% by weight of all polymerizable material in the composition.

2. The polymerizable composition of claim 1, wherein upon reaction a —C—S—C—C— linkage is formed.

3. The polymerizable composition of claim 1, wherein the thiol-containing compound and the ethylenically unsaturated compound are separate and distinct compounds.

4. The polymerizable composition of claim 1, wherein the organoborane-base complex does not include a thiol group.

5. The polymerizable composition of claim 1, wherein the organoborane portion of the organoborane-base complex is of the formula $B(R^1)(R^2)(R^3)$ wherein:
   $R^1$ represents an alkyl group having from 1 to 10 carbon atoms; and
   $R^2$ and $R^3$ independently represent:
     alkyl groups having 1 to 10 carbon atoms;
     cycloalkyl groups having 3 to 10 carbon atoms;
     aryl groups having 6 to 12 carbon atoms; or
     aryl groups substituted with alkyl groups having 1 to 10 carbon atoms or cycloalkyl groups having 3 to 10 carbon atoms;
   provided that any two of $R^1$, $R^2$, and $R^3$ groups may optionally be part of a ring.

6. The polymerizable composition of claim 1, wherein the base portion of the organoborane-base complex is an amine comprising at least one primary or secondary amine group.

7. The polymerizable composition of claim 1, wherein the polymerizable composition is a multi-part polymerizable composition.

8. The polymerizable composition of claim 1, wherein the multi-part polymerizable composition comprises:
   a part A composition comprising the organoborane-base complex; and
   a part B composition comprising the decomplexing agent;
   wherein the thiol-containing compound is in part A, part B, or another part distinct from parts A and B; and
   wherein the ethylenically unsaturated compound is in part A, part B, or another part distinct from parts A and B.

9. The polymerizable composition of claim 1, wherein the thiol-containing component comprises at least one polymerizable thiol-containing compound selected from those prepared from a ring-opening reaction of epoxides with $H_2S$, those prepared from the addition of $H_2S$ across carbon-carbon double bonds, polysulfides, polydimethylsiloxanes in which some of the methyl groups have been replaced by mercaptoalkyl groups, and those prepared from the esterification of polyols with thiol-containing carboxylic acids or their derivatives.

10. The polymerizable composition of claim 1, wherein the ethylenically unsaturated compound is selected from polyfunctional vinyl ethers, vinyl silicones, vinyl aliphatics, (meth)acrylates, allyl ethers, allyl esters, and allyl amides.

11. The polymerizable composition of claim 1, wherein the amount of the thiol groups in the thiol-containing component and the amount of the ethylenically unsaturated groups in the ethylenically unsaturated component are in a molar ratio range of 0.25:1.0 to 4.0:1.0.

12. A polymerizable composition comprising:
  a part A composition comprising an organoborane-base complex, wherein the base is a complexing agent selected from a compound having one or more amine groups, amidine groups, hydroxide groups, alkoxide groups, or a combination thereof, wherein the complexing agent is free of aziridines; and
  a part B composition comprising a decomplexing agent that liberates the organoborane from the organoborane-base complex, wherein the decomplexing agent comprises a 1,3-dicarbonyl compound;
  wherein the polymerizable composition further comprises:
    a polymerizable thiol-containing component comprising at least one polymerizable thiol-containing compound having a plurality of thiol groups in which the sulfur atom of the thiol group is covalently bonded to carbon; and
    a polymerizable ethylenically unsaturated component comprising at least one polymerizable ethylenically unsaturated compound having a plurality of ethylenically unsaturated groups;
  wherein the total amount of the thiol-containing and ethylenically unsaturated compounds total at least 50% by weight of all polymerizable material in the composition.

13. The polymerizable composition of claim 12, wherein upon reaction a —C—S—C—C— linkage is formed.

14. The polymerizable composition of claim 12, wherein the organoborane portion of the organoborane-base complex is of the formula $B(R^1)(R^2)(R^3)$ wherein:
  $R^1$ represents an alkyl group having from 1 to 10 carbon atoms; and
  $R^2$ and $R^3$ independently represent:
    alkyl groups having 1 to 10 carbon atoms;
    cycloalkyl groups having 3 to 10 carbon atoms;
    aryl groups having 6 to 12 carbon atoms; or
    aryl groups substituted with alkyl groups having 1 to 10 carbon atoms or cycloalkyl groups having 3 to 10 carbon atoms;
  provided that any two of $R^1$, $R^2$, and $R^3$ groups may optionally be part of a ring.

15. The polymerizable composition of claim 12, wherein the base portion of the organoborane-base complex is an amine comprising at least one primary or secondary amine group.

16. A composition prepared by combining components comprising:
  a part A composition comprising an organoborane-base complex, wherein the base is a complexing agent selected from a compound having one or more amine groups, one or more amidine groups, one or more hydroxide groups, one or more alkoxide groups, or a combination thereof, wherein the complexing agent is free of aziridines; and
  a part B composition comprising a decomplexing agent that liberates the organoborane from the organoborane-base complex, wherein the decomplexing agent comprises a 1,3-dicarbonyl compound;
  wherein the part A composition and/or the part B composition further comprises:
    a polymerizable thiol-containing component comprising at least one polymerizable thiol-containing compound having a plurality of thiol groups in which the sulfur atom of the thiol group is covalently bonded to carbon; and
    a polymerizable ethylenically unsaturated component comprising at least one polymerizable ethylenically unsaturated compound having a plurality of ethylenically unsaturated groups;
  wherein the total amount of the thiol-containing and ethylenically unsaturated compounds total at least 50% by weight of all polymerizable material in the composition.

17. The composition of claim 16, wherein the organoborane portion of the organoborane-base complex is of the formula $B(R^1)(R^2)(R^3)$ wherein:
  $R^1$ represents an alkyl group having from 1 to 10 carbon atoms; and
  $R^2$ and $R^3$ independently represent:
    alkyl groups having 1 to 10 carbon atoms;
    cycloalkyl groups having 3 to 10 carbon atoms;
    aryl groups having 6 to 12 carbon atoms; or
    aryl groups substituted with alkyl groups having 1 to 10 carbon atoms or cycloalkyl groups having 3 to 10 carbon atoms;
  provided that any two of $R^1$, $R^2$, and $R^3$ groups may optionally be part of a ring.

18. The composition of claim 16, wherein the base portion of the organoborane-base complex is an amine comprising at least one primary or secondary amine group.

* * * * *

UNITED STATES PATENT AND TRADEMARK OFFICE
CERTIFICATE OF CORRECTION

PATENT NO. : 10,513,583 B2
APPLICATION NO. : 15/129331
DATED : December 24, 2019
INVENTOR(S) : Robert Clough et al.

Page 1 of 2

It is certified that error appears in the above-identified patent and that said Letters Patent is hereby corrected as shown below:

In the Specification

Column 1
Line 17, Delete "Oz" and insert -- $O_2$ --, therefor.

Column 10
Line 34, Delete "N,N,N," and insert -- N,N,N', --, therefor.

Column 18
Line 13, Delete "2,5-norbomadiene," and insert -- 2,5-norbornadiene, --, therefor.

Column 18
Line 14, Delete "2-norbomene," and insert -- 2-norbornene, --, therefor.

Column 19
Line 60, Delete "—$CH_2SH$]3" and insert -- —$CH_2SH]_3$ --, therefor.

Column 20
Line 53, Delete "—$CH_2SH$]3" and insert -- —$CH_2SH]_3$ --, therefor.

Column 25
Line 61, Delete "awl" and insert -- aryl --, therefor.

Signed and Sealed this
Eighth Day of September, 2020

Andrei Iancu
*Director of the United States Patent and Trademark Office*

CERTIFICATE OF CORRECTION (continued)
U.S. Pat. No. 10,513,583 B2

Column 34

Lines 31-37 (Approx.), Delete " 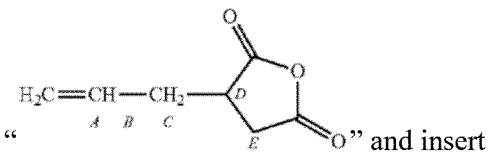 " and insert -- 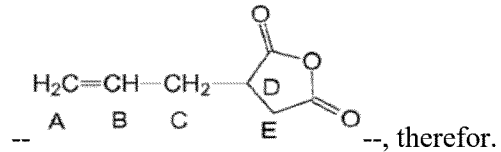 --, therefor.